US008166047B1

(12) United States Patent
Cohen et al.

(10) Patent No.: US 8,166,047 B1
(45) Date of Patent: Apr. 24, 2012

(54) SYSTEMS, DEVICES, AND/OR METHODS FOR MANAGING DATA

(75) Inventors: Edith Cohen, Berkeley Heights, NJ (US); Haim Kaplan, Had Hasharon (IL)

(73) Assignee: AT&T Intellectual Property I, L.P., Atlanta, GA (US)

( * ) Notice: Subject to any disclaimer, the term of this patent is extended or adjusted under 35 U.S.C. 154(b) by 710 days.

(21) Appl. No.: 12/186,873

(22) Filed: Aug. 6, 2008

(51) Int. Cl.
*G06F 7/00* (2006.01)
*G06F 17/30* (2006.01)

(52) U.S. Cl. .......................................... 707/748; 706/48
(58) Field of Classification Search .................. 707/748, 707/999.2; 706/48
See application file for complete search history.

(56) References Cited

U.S. PATENT DOCUMENTS

| 4,930,077 | A | 5/1990 | Fan |
| 5,371,673 | A | 12/1994 | Fan |
| 6,449,603 | B1 | 9/2002 | Hunter |
| 6,535,819 | B1 | 3/2003 | Clark |
| 2008/0086444 | A1 | 4/2008 | Yu |

OTHER PUBLICATIONS

Alon, "Estimating Arbitrary Subset Sums with Few Probes", Jun. 13, 2005, pp. 317-325, Proceeding of the 24th ACM Symposium on Principles of Database Systems.
Beyer, "On Synopses for Distinct-Value Estimation Under Multiset Operations", Jun. 12, 2007, pp. 199-210, SIGMOD '07, Beijing, China, ACM, 2007.
Bharat, "Mirror, Mirror on the Web: A Study of Host Pairs with Replicated Content", Jan. 1, 1999, pp. 501-512, Proceedings of the 8th International World Wide Web Conference (WWW).
Broder, "Identifying and Filtering Near-Duplicate Documents", 2000, 10 pages, Proceedings of the 11th Annual Symposium on Combinatorial Pattern Matching, LLNCS, V 1848; Springer-Verlag.
Broder, "Min-Wise Independent Permutations", Jun. 22, 1998, pp. 630-659, Journal of Computer and System Sciences, 60(3).
Broder, "On the resemblance and containment of documents", 1997, pp. 21-29, Proceedings of the Compression and Complexity of Sequences, ACM.
Chazelle, "Fractional Cascading: I. A Data Structuring Technique", Feb. 18, 1986, pp. 133-162, Algorithmica, 1(2); Springer-Verlag New York.
Chazelle, "Fractional Cascading: II. Applications", Feb. 18, 1986, pp. 163-191, Algorithmica, I: Springer-Verlag New York.
Chiang, "Dynamic Algorithms in Computational Geometry", Sep. 1, 1992, pp. 1412-1434, Proceedings of the IEEE, 80(9).
Cisco, "Cisco Netflow", accessed prior to Aug. 6, 2008, 1 page, http://www.cisco.com/warp/public/732/Tech/netflow.
Cohen, "Algorithms and Estimators for Accurate Summarization of Internet Traffic", Oct. 24, 2007, pp. 265-278, Proceedings of the 7th ACM SIGCOMM Conference on Internet Measurement, San Diego, CA, US.
Cohen, "Efficient Estimation Algorithms for Neighborhood Variance and Other Moments", Jan. 1, 2004, pp. 157-166, Proceedings of 15th ACM-SIAM Symposium on Discrete Algorithms, 2004.
Cohen, "Maintaining Time-Decaying Stream Aggregates", Jun. 9, 2003, 11 pages, Proceeding of the 2003 ACM Symposium on Principles of Database Systems (PODS 2003); ACM.

(Continued)

*Primary Examiner* — Jay Morrison
(74) *Attorney, Agent, or Firm* — Akerman Senterfitt; Michael K. Dixon; Roy Zachariah

(57) ABSTRACT

Certain exemplary embodiments can provide a method, which can comprise automatically storing and computing a sketch of a dataset that supports an automatically determined estimator of properties of a dataset. The dataset can be related to any population. For example, the dataset can comprise data flows through a network node (e.g., a router), sales data, and/or marketing data, etc. The estimator can be based upon a sketch of the dataset.

20 Claims, 6 Drawing Sheets

OTHER PUBLICATIONS

Cohen, "Size-Estimation Framework with Applications to Transitive Closure and Reachability", Jul. 8, 1996, Journal Comput. System Sci., 55, pp. 441-453.

Cohen, "Sketch-Based Estimation of Subpopulation-Weight", Feb. 23, 2008, 20 pages, Technical Report 802.3448, CORR; from ACM SIGMOD '08, Vancouver, BC, Canada.

Cohen, "Sketching Unaggregated Data Streams for Subpopulations-Size Queries", Jun. 11, 2007, pp. 253-262, Proceedings of the 2007 ACM Symposium on Principles of Database Systems (PODS 2007), Beijing, China; ACM 2007.

Cohen, "Spatially-Decaying Aggregation Over a Network: Model and Algorithms", Jun. 13, 2004, 12 pages, J. Comput. System Sci., 73, 2007.

Cohen, "Subpopulation-Weight Estimators and Confidence Bounds for Bottom-k Sketches", Oct. 26, 2007, 33 pages, AT&T Research Labs.

Cohen, "Summarizing Data Using Bottom-k Sketches", Aug. 12, 2007, 10 pages, Proceedings of ACM PODC' 07, Portland, Oregon, US.

Cohen, "Variance optimal sampling based estimation of subset sums", Mar. 4, 2008, 16 pages, Technical Reprot cs.DS/0803.0473, Computing Research Repository (CoRR).

Cohen, "When Piecewise Determinism is Almost True", Dec. 1, 1995, pp. 66-71, Proceedings of Pacific Rim International Symposium on Fault-Tolerant Systems.

Cohen, "Bottom-k Sketches: Better and More Efficient Estimation of Aggregates", Jun. 12, 2007, 2 pages, Proceedings of the ACM SIGMETRICS '07 Conference.

Dasu, "Mining Database Structure; Or, How to Build a Data Quality Browser", Jun. 4, 2002, pp. 240-251, ACM SIGMOD '2002, Madison, WI, US.

Driscoll, "Making Data Structures Persistent", Jan. 1, 1986, pp. 109-121, Proceedings of the 18th Annual ACM Symposium on Theory of Computing.

Duffield, "Flow Sampling Under Hard Resource Constraints", Jun. 12, 2004, pp. 85-96, Proceedings of the ACM IFIP Conference on Measurement and Modeling of Computer Systems (SIGMETRICS/Perfomance).

Duffield, "Learn More, Sample Less: Control of Volume and Variance in Network Measurement", May 1, 2005, pp. 1756-1775, IEEE Transactions in Information Theory, 51(5).

Duffield, "Priority Sampling for Estimation of Arbitrary Subset Sums", Dec. 1, 2007, 37 pages, Journal of the ACM, 54(6).

Flajolet, "Probabilistic Counting Algorithms for Data Base Applications", Oct. 1, 1985, pp. 182-209, Journal of Computer and System Sciences, 31, 2, Academic Press, NY, US.

Gibbons, "New Sampling-Based Summary Statistics for Improving Approximate Query Answers", Jun. 1, 1998, pp. 331-342, SIGMOD ACM, 27(2).

Henzinger, "Finding Near-Duplicate Web Pages: A Large-Scale Evaluation of Algorithms", Aug. 6, 2006, pp. 284-291, from SIGIR '06, Seattle, WA, US; ACM 2006.

Kaplan, "Randomized Incremental Constructions of Three-Dimensional Convex Hulls and Planar Voronoi Diagrams, and Approximate Range Counting", Jan. 22, 2006, pp. 484-493, SODA '06: Proceedings of the 17th Annual ACM-SIAM Symposium on Discrete Algorithm; ACM Press, New York, US.

Manku, "Detecting Near-Duplicates for Web Crawling", May 8, 2007, pp. 141-149, from IW3C2 (WWW) 2007, Banff, Alberta, Canada; ACM.

Mosk-Aoyama, "Computing Separable Functions via Gossip", Jul. 22, 2006, pp. 113-122, Proceedings of the ACM PODC '06 Conference, Denver, Colorado, US.

Motwani, "Finding Interesting Associations without Support Pruning", Oct. 19, 1999, 17 pages, IEEE Transactions on Knowledge and Data Engineering, 13, 2001.

Netflix, Inc., "The Netflix Prize", accessed prior to Aug. 6, 2008, 1 page, http://www.netflixprize.com.

Spring, "A Protocol-Independent Technique for Eliminating Redundant Network Traffic", Jan. 1, 2000, pp. 87-95, Proceedings of the ACM SIGCOMM '00 Conference, ACM 2000.

Szegedy, "The DLT Priority Sampling is Essentially Optimal", May 21, 2006, 9 pages, Proceedings of the 38th Annual ACM Symposium on Theory of Computing, Seattle, Washington, ACM 2006, USA.

Thorup, "Confidence Intervals for Priority Sampling", Jun. 26, 2006, pp. 252-263, from SIGMetrics/Performance '06, Saint Malo France; ACM 2006.

Cohen, "Algorithms and Estimators for Summarization of Unaggregated Data Streams", Sep. 10, 2007, 39 pages, Available for download at www.research.att.com/~edith/Papers/unaggstreams.pdf.

Horvitz, "A Generalization of Sampling Without Replacement from a Finite Universe", Dec. 1952, pp. 633-685, Journal of the American Statistical Association, vol. 47, No. 260.

Rao, "πPS Sampling Designs and the Horvitz-Thompson Estimator", Dec. 1971, pp. 872-875, Journal of the American Statistical Association, vol. 66, No. 336.

Berg, "Computational Geometry: Algorithms and Applications, Third Edition", 1997, 2000, 2008, 386 pages, Springer Verlag, Berlin.

Sampath, "Sampling Theory and Methods", 2005, 199 pages, Alpha Science International, Harrow, U.K.

Singh, "Elements of Survey Sampling", 1996, 388 pages, Kluwer Academic Publishers, AA Dordrecht, The Netherlands.

6000

SYSTEMS, DEVICES, AND/OR METHODS FOR MANAGING DATA

CROSS-REFERENCES TO RELATED APPLICATIONS

This application incorporates by reference herein in its entirety, a related and concurrently filed application entitled "Systems, Devices, and/or Methods for Determining Dataset Estimators" Ser. No. 12/186,997.

BACKGROUND

United States Patent Publication 20080086444 ("Yu"), which is incorporated by reference herein in its entirety, allegedly discloses a "system and method for improving cardinality estimation in a relational database management system is provided. The method is suitable for use with a query optimizer for improved estimation of various predicates in the query optimizer's cost estimation plan by combining pre-computed statistics and information from sampled data. The system and method include sampling a relational database for generating a sample dataset and estimating cardinalities of the sample dataset. The estimated cardinalities sample datasets are reduced in accordance with the present invention by determining a first and second weight set, and minimizing a distance between the first and second weight set." See Abstract.

U.S. Pat. No. 6,535,819 ("Clark"), which is incorporated by reference herein in its entirety, allegedly discloses "[t]he method of this invention identifies distinctive items of information from a larger body of information on the basis of similarities or dissimilarities among the items and achieves a significant increase in speed as well as the ability to balance the representativeness and diversity among the identified items by applying selection criteria to randomly chosen sub-samples of all the information. The method is illustrated with reference to the compound selection requirements of medicinal chemists. Compound selection methods currently available to chemists are based on maximum or minimum dissimilarity selection or on hierarchical clustering. The method of the invention is more general and incorporates maximum and minimum dissimilarity-based selection as special cases. In addition, the number of iterations utilized to select the items is a multiple of the group size which, at its greatest, is approximately the square root of the population size. Thus, the selection method runs much faster than the methods of the prior art. Further, by adjusting the subsample size parameter K, it is possible to control the balance between representativeness and diversity in the compounds selected. In addition, the method can mimic the distributional properties of selections based on hierarchical clustering and, at least in some cases, improve upon them." See Abstract.

SUMMARY

Certain exemplary embodiments can provide a method, which can comprise automatically storing an estimator of properties of a dataset. The dataset can be related to any population. For example, the dataset can comprise data flows through a network node (e.g., a router), sales data, and/or marketing data, etc. The estimator can be based upon a sketch of the dataset. Estimators of the sketch can have exponentially distributed ranks.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
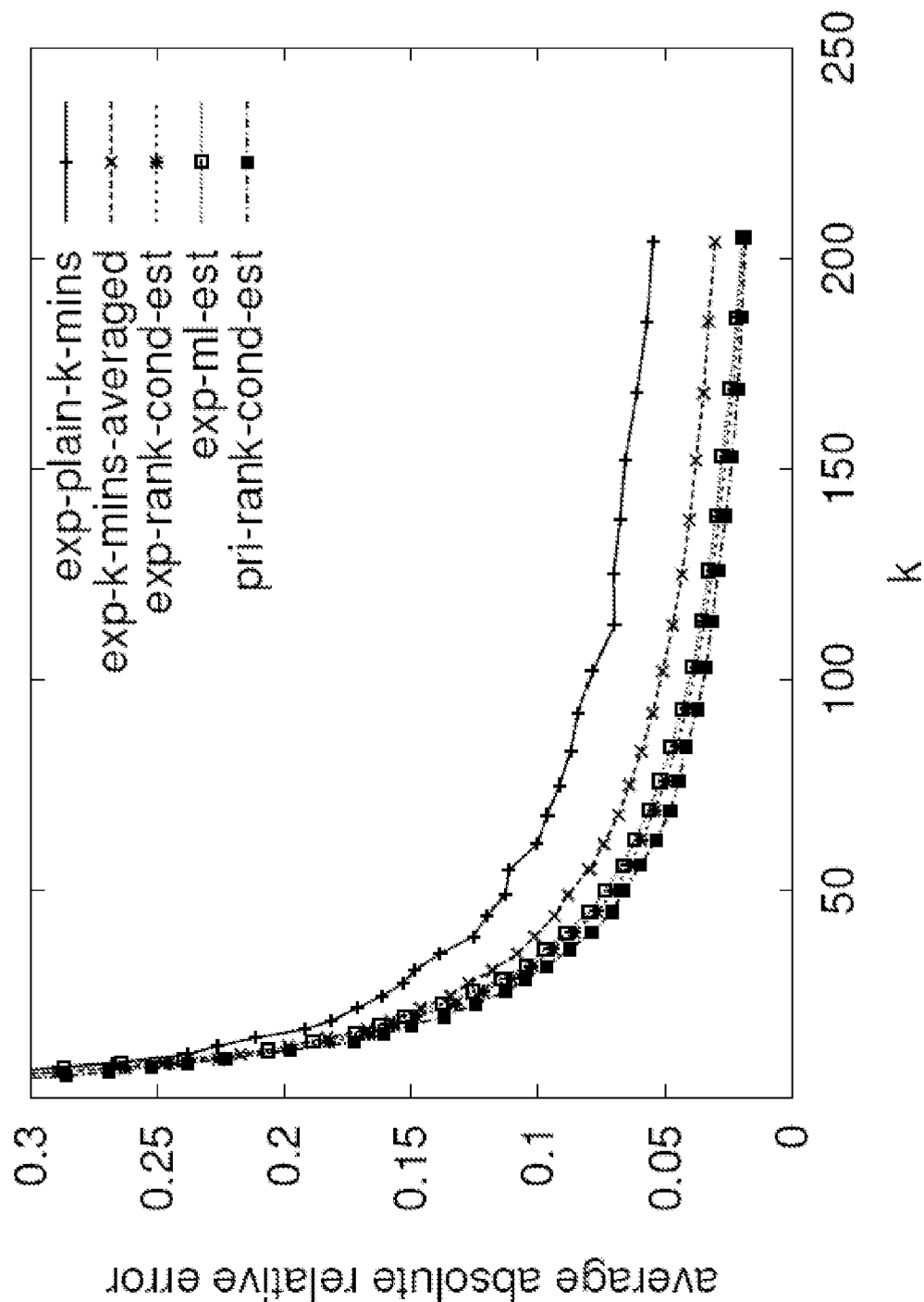
FIG. 1 is a block diagram of an exemplary embodiment of a set if graphs indicative of absolute relative errors in estimated parameters as a function of sketch size for various sketches.

Certain exemplary embodiments can provide a method, which can comprise automatically storing an estimator of properties of a dataset. The dataset can be related to any population. For example, the dataset can comprise data flows through a network node (e.g., a router), sales data, and/or marketing data, etc. The estimator can be based upon a sketch of the dataset. Estimators of the sketch can have exponentially distributed ranks. As used herein, the phrase exponentially distributed means a random variable from an exponential distribution, that is, a distribution with probability density function: $\lambda e^{-\lambda x}$ for $x >= 0$ and 0 for $x < 0$.

The following indented paragraphs immediately following the present paragraph describe one or more exemplary embodiments and are illustrative and not restrictive in their scope.

> A Bottom-k sketch is a summary of a set of items with nonnegative weights that supports approximate query processing. As used herein, the phrase query means (n.) a request, such as for information from a database; (v.) to request and/or obtain information, such as from a database in response to a structured request. As used herein, the phrase weight means a numeric value (non-negative real number) that is associated with an item. As used herein, the phrase value means a measured, assigned, determined, and/or calculated quantity or quality for a variable and/or parameter. As used herein, the phrase sketch means a summary of a set of items with nonnegative weights that supports approximate query processing. As used herein, the phrase item means a single article of a plurality of articles. As used herein, the phrase plurality means the state of being plural and/or more than one. As used herein, the phrase term a means at least one. A sketch is obtained by associating with each item in a ground set an independent random rank drawn from a probability distribution that depends on the weight of the item and including the k items with smallest rank value. As used herein, the phrase $k^{th}$ smallest means a largest value of a set of k values, the k values having smaller values than other values of a set. As used herein, the phrase rank means an independent random variable assigned to an item that is drawn from a distribution that depends on the weight of the item. As used herein, the phrase obtain means to receive, get, take possession of, procure, acquire, calculate, determine, and/or compute. As used herein, the phrase from means used to indicate a source. As used herein, the phrase each means every one of a group considered individually.

Bottom-k sketches are an alternative to k-mins sketches, which consist of the k minimum ranked items in k independent rank assignments, and of min-hash sketches, where hash functions replace random rank assignments. As used herein, the phrase replace means to substitute one thing for another. Sketches support approximate aggregations, including weight and selectivity of a subpopulation. As used herein, the phrase subpopulation means a portion of a larger set of data and/or entities. As used herein, the phrase selectivity means a fraction of items that satisfy a given predicate regarding items attribute values. Coordinated sketches of multiple subsets over the same ground set support subset-relation queries such as Jaccard similarity or the weight of the union. As used herein, the phrase coordinate means to interact regarding movements and/or functions. As used herein, the phrase union means a set containing all and only the members of two or more given sets. As used herein, the phrase subset means a portion of a set. All-distances sketches are applicable for datasets where items lie in some metric space such as data streams (time) or networks. As used herein, the phrase distance means a measure of physical and/or logical separation. As used herein, the phrase data means information represented in a form suitable for processing by an information device. As used herein, the phrase information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information. As used herein, the phrase store means to place, hold, and/or retain in a memory. As used herein, the phrase device means a machine, manufacture, and/or collection thereof. As used herein, the phrase dataset means a relatively large body of information represented in a form suitable for processing by an information device. These sketches compactly encode the respective plain sketches of all neighborhoods of a location. As used herein, the phrase neighborhood means a nearby area within a set maximum distance from a reference location. As used herein, the phrase location means a place. These sketches support queries posed over time windows or neighborhoods and time/spatially decaying aggregates.

An important advantage of bottom-k sketches is much tighter estimators for several basic aggregates. As used herein, the phrase estimator means a statistical and/or calculable parameter associated with a population and/or a sub-population. To materialize this benefit, we can adapt traditional k-mins applications to use bottom-k sketches. As used herein, the phrase can means is capable of, in at least some embodiments. As used herein, the phrase application means a set of computer-readable instructions and/or a computer program. As used herein, the phrase compute means to calculate, estimate, determine, and/or ascertain via a processor. As used herein, the phrase via means by way of and/or utilizing. As used herein, the phrase determine means to find and/or decide upon. As used herein, the phrase estimate means (n.) a calculated value approximating an actual value; (v.) to calculate and/or determine approximately and/or tentatively. We propose all-distances bottom-k sketches and develop and analyze data structures that incrementally construct bottom-k sketches and all-distances bottom-k sketches. As used herein, the phrase bottom-k sketch means a summary of a set of items with nonnegative weights that supports approximate query processing. The summary contains k items. The distribution of items included in the sketch corresponds to associating independent random rank values that are drawn from a probability distribution parametrized by the weight for each item, and taking the k items with smallest rank value. As used herein, the phrase correspond means to be related, associated, accompanying, similar in purpose and/or position, conforming in every respect, and/or equivalent and/or agreeing in amount, quantity, magnitude, quality, and/or degree. As used herein, the phrase all-distance bottom-k sketch means a compact encoding of plain bottom-k sketches of neighborhoods of a certain location in which, for a given distance, the sketch in a neighborhood within the given distance of the location can be constructed from the all-distances sketch.

Another advantage of bottom-k sketches is that when the data is represented explicitly, they can be obtained much more efficiently than k-mins sketches. We show that k-mins sketches can be derived from respective bottom-k sketches, which enables the use of bottom-k sketches with off-the-shelf k-mins estimators (In fact, we obtain tighter estimators since each bottom-k sketch is a distribution over k-mins sketches). As used herein, the phrase derive means obtain via determining, calculating, and/or looking-up.

Sketching or sampling is an extremely useful tool for storage and queries on massive datasets. Sketches allow us to process approximate queries on the original datasets while occupying a fraction of the storage space utilized for the full dataset and using a fraction of the computation resources utilized for the exact answer. As used herein the phrase answer means (n.) a reply and/or response; (v.) to reply. The value of a sketching method depends on the efficiency of its implementation, its versatility in terms of the operations supported, and the quality of the estimates obtained.

Bottom-k and k-mins sketches are summaries of a set of items with positive weights. k-mins sketches (The min-rank method) are obtained by assigning independent random ranks to items where the distribution used for each item depends on the weight of the item. We retain the minimum rank of an item in the set. This is repeated with k independent rank assignments for some integer $k \geq 1$ and we obtain a k-vector of independent minimum ranks and k independent weighted samples. Bottom-k sketches are an emerging alternative to k-mins sketches. Bottom-k sketches are constructed using a single rank assignment. The bottom-k sketch of a subset contains the k items with smallest ranks in the subset.

The sketch supports approximate query processing over the original dataset and subpopulations of this dataset. Basic aggregations include the weight of the set or the selectivity of a subpopulation (subset) of the set and derived aggregations include approximate quantiles, average weight, and variance and higher moments. As used herein, the phrase variance means a measure of variation of a set of observations defined by a sum of the squares of deviations from a mean, divided by a number of degrees of freedom in the set of observations. The sketch of a set is a weighted random sample. When used with exponentially distributed ranks, bottom-k sketches are a weighted sample without replacement (WS-sketches) whereas k-mins sketches are a weighted sample with replacement (WSR-sketches).

In applications where there are multiple subsets that are defined over the same ground set of items, a sketch is produced for each subset. As used herein, the phrase define means to establish the meaning, relationship, outline, form, and/or structure of; and/or to precisely and/or distinctly describe and/or specify. The sketches of different subsets are "coordinated," sharing the same rank assignments to the items of the ground set, and support queries over subset relations, such as the weight of the union or intersection, their weight ratio, and resemblance or Jaccard similarity coefficient. As used herein, the phrase different means changed, distinct, and/or separate. As used herein, the phrase Jaccard similarity means a quantitative measure of resemblance. A useful property of "coordinated" sketches is that the sketch of a union can be computed from the sketches of the subsets. As used herein, the phrase property means a parameter associated with a characteristic. Therefore, given sketches of subsets, we can perform aggregations on unions of subsets. As used herein, the phrase perform means to begin, take action, do, fulfill, accomplish, carry out, and/or complete, such as in accordance with one or more criterion.

Example of an application with multiple subsets is when items are associated with nodes of a directed graph and we compute k-mins sketches for the reachability set of each node. As used herein, the phrase node, with the exception of network node devices, means a related subset of values of a dataset. As used herein, the phrase associated with means related to. These sketches can be computed in $\tilde{O}(km)$ time (and storage) whereas an explicit representation of the subsets utilizes $O(mn)$ time. Applications include maintaining a sketch of influencing events for each process in a computer system, when a process A affects process B, the new sketch of B becomes the sketch of the union; and using the property that the sketches reduce the approximate sum problem to that of finding a minimum. In certain exemplary embodiments, k-mins sketches can be used for aggregations on gossip networks. As used herein, the phrase sum means (n.) a total obtained via the addition of a plurality of values; (v.) to add. As used herein, the phrase new means having been made, defined, determined, and/or coming into existence relatively recently as compared to something else. As used herein, the phrase maintain means to retain, preserve, sustain, keep in an existing state, and/or continue to obtain.

Other applications with multiple subsets where sketches support fast computation of subset relations are near-duplicate detection for Web pages (a sketch is produced for each Web page), study of similar Web sites, mining of association rules from market basket data, and eliminating redundant network traffic. As used herein, the phrase market means (n.) a commercial activity; (v.) to encourage buyers and/or to attempt to sell. In these applications, a variant termed min-hash sketches substitutes random rank assignments with random hash functions (families of min-wise independent hash functions or ε-min-wise functions). With random hash functions, the rank assignment of an item depends on the item identifier, and it has the property that all copies of the same item across different subsets obtain the same rank, without additional book keeping or coordination between all occurrences of each item. As used herein, the phrase between means in a separating interval and/or intermediate to. This allows for efficient aggregations over distinct occurrences (see) and supports subset-relation queries.

Bottom-k sketches encode more information than k-mins sketches. (Intuitively, sampling without replacement is more informative than sampling with replacement). In certain exemplary embodiments, bottom-k sketches can be superior to k-mins sketches in terms of estimate quality. Estimators for subpopulation weight using priority ranks (PRI-sketches) can be provided and estimators for general families of rank functions can be provided. As used herein, the phrase provide means to furnish, supply, give, convey, send, and/or make available. The improvement in estimate quality is significant on weight distributions and values of k, such that items are likely to be sampled multiple times in a k-sample drawn with replacement, such as skewed Zipf-like distributions that often arise in practice. For subset relations such as the weight of the intersection or union, bottom-k sketches improve over k-mins sketches even when weights are uniform: Carefully designed estimators are applied to the combined bottom-k sketches, which reveal more members of the union and intersection than two corresponding k-mins sketches. As used herein, the phrase applied means incident directly and/or indirectly upon.

We facilitate the use of bottom-k sketches by developing and analyzing data structures that construct these sketches. Our results allow applications that use k-mins sketches to use the superior bottom-k sketches. An inherent difference we had to tackle is that k-mins sketches are obtained using k independent rank functions, which allows for k independent copies of the same simple data structure to be used whereas bottom-k entries are dependent.

Sketches are constructed incrementally as items are processed. The sketch is manipulated through two basic operations: A test operation which tests if the sketch has to be updated, and an update operation which inserts the new item if the sketch indeed has to be updated. As used herein, the phrase update means to make current. As used herein, the phrase test means to evaluate. As used herein, the phrase through means in one side and out the opposite or another side of, across, among, and/or between. We make this distinction since test operations can be performed much more efficiently than update operations. The number of update operations depends on the order in which items are processed and on the weight distribution of the data. As used herein, the phrase order means a degree in a continuum of size or quantity. As used herein, the phrase size means physical dimensions, proportions, magnitude, amount, and/or extent of an entity. The number of test operations is typically larger than the number of updates. The extent in which it is larger, however, highly depends on the application.

We distinguish between applications with explicit representation or implicit representation of the data. In applications with an explicit representation, item-subset pairs are provided explicitly. The dataset could be distributed, presented as a data stream, or in external memory, but the pairs are explicitly provided and are all processed to produce the sketches. In applications with implicit representation, the subsets are specified as neighborhoods in a graph or some metric space. With explicit representation, the number of test operations is much larger than the number of update operations. We analyze the number of test and update operations and how it depends on the way the data is presented and on the distribution of the item weights.

All-distances sketches are a generalization of plain sketches that are used when the underlying dataset has items associated with locations in some metric space, and subsets are specified by neighborhoods of a location. All-distances k-mins sketches were used for data streams (where aggregation is over windows of elapsed time to the present time), the Euclidean plane (where we are presented with a query point and distance), a graph (the query is a node and distance), or distributed "spatial aggregation" over a network. An all-distances sketch is a compact encoding of the plain sketches of all neighborhoods of a certain location q. For a given distance d, the sketch for the d-neighborhood of the location can be constructed from the all-distances sketch. All-distances sketches also support time-decaying and spatially-decaying aggregates using arbitrary decay functions. As used herein, the phrase arbitrary means not necessarily conforming to a predetermined structure. As used herein, the phrase predetermined means determine, decide, or establish in advance. Certain exemplary embodiments define bottom-k all-distances sketches and present efficient data structures for maintaining both all-distances k-mins sketches and all-distances bottom-k sketches. We analyze the number of operations utilized to construct all-distances sketches under different arrival orders of the items.

We provide a method to derive WSR-sketches (k-mins with exponential ranks) from WS-sketches (bottom-k with exponential ranks). This mimicking process provides a general method of applying estimators designed for WSR-sketches to WS-sketches. This process enables us to use bottom-k sketches in applications (such as those with explicit representation of the data) where they can be obtained much more efficiently than k-mins sketches and use readily available WSR-sketches estimators. In fact, since each WS-sketch corresponds to a distribution over WSR-sketches, we obtain estimators with smaller variance than the underlying WSR-sketches estimators. This reduction also shows that WS-sketches are strictly superior to WSR-sketches. We provide examples of applications of the mimicking process.

Let I be a ground set of items, where item $i \in I$ has weight $w(i) \geq 0$. A rank assignment maps each item i to a random rank r(i). The ranks of items are drawn independently using a family of distributions $f_w$, ($w \geq 0$), where the rank of an item with weight w(i) is drawn according to $f_{w(i)}$.

We use random rank assignments to obtain sketches of subsets as follows. For a subset J of items and a rank assignment r we define $B_1(r,J)=\mathrm{argmin}_{j \in J} r(j)$, to be the item in J with smallest rank according to r. For $i \in \{1, \ldots, |J|\}$, we define $B_i(r,J)$ to be the item in J with i th smallest rank according to r and $r_i(J) \equiv r(B_i(r,J))$ to be the i th smallest rank value in J according to r.

Definition 1. k-mins sketches are produced from k independent rank assignments, $r^{(1)}, \ldots, r^{(k)}$. The k-mins sketch of a subset J is the k-vector $(r_1^{(1)}(J), r_1^{(2)}(J), \ldots, r_1^{(k)}(J))$.

To support some queries, we may need to include with each entry an identifier or some other attributes such as the weight of the items $B_1(r^{(j)},J)$ (j=1, ..., k). As used herein, the phrase may means is allowed and/or permitted to, in at least some embodiments.

Definition 2. Bottom-k sketches are produced from a single rank assignment r. The bottom-k sketch s(r,J) of the subset J is a list of entries $(r_i(J), w(B_i(r,J)))$ for i=1, ..., k. The list is ordered by rank, from smallest to largest.

The bottom-k sketch of a subset is therefore a list with up to k entries. The size of the list is the minimum of k and the number of items in the subset. For a single item i (a subset of size 1), the bottom-k sketch is a list with a single entry $(r_1(J), w(B_1(r,J)))$. To support queries, in addition to the weight, entries in the sketch may include an identifier and attribute values of items $B_i(r,J)$ (i= 1, ..., k).

Bottom-k and k-mins sketches have the following useful property: The sketch of a union of two sets can be generated from the sketches of the two sets. Let J and H be two subsets. As used herein, the phrase generate means to create, produce, render, give rise to, and/or bring into existence. For any rank assignment r, $r_1(J \cup H) = \min\{r_1(J), r_1(H)\}$.

Therefore, for k-mins sketches we have $(r_1^{(1)}(J \cup H), \ldots, r_1^{(k)}(J \cup H)) = (\min\{r_1^{(1)}(J), r_1^{(1)}(H)\}, \ldots, \min\{r_1^{(k)}(J), r_1^{(k)}(H)\})$. For bottom-k sketches, the k smallest ranks in the union $J \cup H$ are contained in the union of the sets of the k-smallest ranks in each of J and H. That is, $s(r,J \cup H) \subset s(r,J) \cup s(r,H)$. Therefore, the bottom-k sketch of $J \cup H$ can be computed by taking the entries with k smallest ranks in the combined sketches of J and H.

To support sketch-based set operations and queries, we need to store the rank values of items. To perform sketch-based queries on a single subset, however, we do not need all rank values. With bottom-k sketches, it is sufficient to store the (k+1)st smallest rank value, $r_{k+1}$: We (re)draw random rank values for each item i in the sketch using $f_{w(i)}$ conditioned on the rank being smaller than $r_{k+1}$. This is just like (re)drawing a random bottom-k sketch from the probability subspace where the minimum rank of items not in the sketch is equal to $r_{k+1}$ and all items in the sketch have ranks smaller than $r_{k+1}$.

Beyond reduced storage, this observation often enables us to obtain tighter estimators. The unbiased rank conditioning estimator for subpopulation weight is applied to the value $r_{k+1}$ and the weights of the items in the (unordered) sketch. As used herein, the phrase unbiased means characterized by a lack of partiality. In some cases, however, it is easier to derive estimator that is applied to the ordered sketch with rank values (the mimicking process is applied to an ordered bottom-k sketch). In this case, instead of applying an estimator to the original sketch and rank values, we take its expectation over re-drawn sketches or its average over multiple draws (if the expectation is hard to compute). As used herein, the phrase expectation means a statistical mean value. This results in an estimator with at most the same variance and often smaller variance. Correctness follows from a basic property of variances:

Lemma 1. Let $a_1$ and $a_2$ be two random variables over $\Omega$. Suppose there is a partition of $\Omega$ such that the value of $a_2$ on each part is equal to the expectation of $a_1$ on that part. Then $\mathrm{var}(a_2) \leq \mathrm{var}(a_1)$.

The choice of which family of random rank functions to use matters only when items are weighted. Otherwise, sketches produced using one rank function can be transformed to any other rank function. We assume to simplify the analysis that all random values are distinct WS-sketches and WSR-sketches. A convenient choice for the rank function $f_w$ is an exponential distribution with parameter w. The density function of this distribution is $f_w(x) = w e^{-wx}$, and its cumulative distribution function is $F_w(x)=1-e^{-wx}$. We refer to k-mins sketches with these ranks as WSR-sketches and to bottom-k sketches with these ranks as WS-sketches.

The minimum rank $r_1(J)$ of an item in a subset $J \subset I$ is exponentially distributed with parameter $w(J)=\Sigma_{i \in J} w(i)$. This follows from the fact that the minimum of random variables each drawn from an exponential distribution is also an exponentially distributed random variable with parameter equal to the sum of the parameters of these distributions. The item with the minimum rank $B_1(r,J)$ is a weighted random sample from J: The probability that an item $i \in J$ is the minimum rank item is $w(i)/w(J)$.

Therefore we can conclude that a WSR-sketch of size k of a subset J is a weighted random sample of size k, drawn with replacement from J (hence the term WSR-sketches). The ranks of these items is a set of k independent samples from an exponential distribution with parameter $w(J)$. Hence, if the weight $w(J)$ is provided and we do not use subset-relation queries rank values are redundant. If $w(J)$ is not provided, the rank values can be used in unbiased estimators for both $w(J)$ and the inverse weight $1/w(J)$. Estimators for the inverse-weight are useful for obtaining unbiased estimates for quantities where the weight appears in the denominator. These include weight ratio of two different subsets, set resemblance of two subsets, and average weight of a subset.

On the other hand, the items in a WS-sketch are samples drawn without replacement from J:

Lemma 2. A WS-sketch of size k of a subset J is a sample of size k drawn without replacement from J.

Proof. The probability that item $i \in J$ is $B_1(r,J)$ is $w(i)/w(J)$. Conditioned on the bottom-j ranked items in J being $i_1, \ldots, i_j$, $B_{j+1}(r,J)$ is $i \in J \setminus \{i_1, \ldots, i_j\}$ with probability $$w(i) / \left( w(J) - \sum_{h=1}^{j} w(i_h) \right).$$

If the weight $w(J)$ is provided and we do not use the sketches for subset-relation queries it suffices to store the unordered set of items in $s(r,J)$. This information allows us to draw at random a bottom-k sketch from the probability subspace that contains all sketches where the set of the bottom-k ranked items is $s(r,J)$.

PRI-sketches. With priority ranks the rank value of an item with weight w is selected uniformly at random from $[0,1/w]$. As used herein, the phrase select means to make and/or indicate a choice and/or selection from among alternatives. This is the equivalent to choosing rank value $r/w$, where $r \in U[0,1]$ is selected from the uniform distribution on the interval $[0,1]$. If $r \in U[0,1]$ then $-\ln(r)/w$ is an exponential random variable with parameter w. Therefore exponential ranks correspond to using rank values $-\ln r/w$ where $r \in U[0,1]$.

Choice of a rank function. The appeal of PRI-sketches is estimators that (nearly) minimizes $\Sigma_{i \in J} \text{var}(\tilde{w}(i))$. More precisely, the sum of per-item variances using PRI-sketches of size k is no larger than the smallest sum of variances attainable by an estimator that uses sketches with average size k−1. The proof applies only to estimators based on adjusted weight assignments. As used herein, the phrase adjust means to change, modify, adapt, and/or alter. As used herein, the phrase modify means to change, cause to change, edit, alter, replace, delete, and/or correct. As used herein, the phrase and/or means either in conjunction with or in alternative to. It also does not apply to estimators on the weight of subpopulations.

WS-sketches offer several other distinct advantages. First, they support unbiased estimators for selectivity (subpopulation fraction); Second, the estimators for selectivity and for subpopulation weight when the weight of the set is known (as in data streams), feature negative covariances between different items. As used herein, the phrase negative means less than approximately zero. As used herein, the phrase less than means having a measurably smaller magnitude and/or degree as compared to something else. As used herein, the phrase covariance means the product of the standard deviations of two given variables and the coefficient of correlation between them. As used herein, the phrase known means recognized or understood. As used herein, the phrase zero means a mathematical value intermediate between positive and negative values.

As used herein, the phrase second means an element in an ordering that immediately follows an initial element. As used herein, the phrase known means previously identified and/or understood by an entity. As used herein, the phrase first means an initial element in an ordering. Therefore, selectivity and weight estimators for larger subpopulations are much tighter than with the known estimator for PRI-sketches.

Unbiased subpopulation weight estimators exist for bottom-k sketches obtained using arbitrary rank functions. These estimators are useful when we want to obtain good estimators with respect to multiple weight functions (e.g., for IP flows datasets we are interested in count of distinct flows and total bandwidth). As used herein, the phrase flow means (n.) a continuous transfer of packets; (v.) to continuously transfer. As used herein, the phrase total means of, relating to, or constituting a whole.

Sketches are produced for each subset of interest in a collection of subsets over a ground set of items. The algorithms for constructing sketches are application-dependent, but on a high level, sketches are constructed using an incremental process, where a current sketch is maintained for each subset of interest, and the sketch is updated when a new information (item, or item and rank value) is presented. As used herein, the phrase current means contemporaneous to the present time.

We identify two operations on the current sketch; a test operation that checks whether incorporating the new information causes a modification of the current sketch and an update operation, which is a modification of the current sketch. As used herein, the phrase whether means which of at least two alternatives. As used herein, the phrase cause means to bring about, provoke, precipitate, produce, elicit, be the reason for, result in, and/or effect. We make the distinction between test and update because as a general rule, applications utilize more tests than updates, and in some applications, updates are costlier than tests. As used herein, the phrase cost means an amount of time and/or money associated with an activity.

We consider the time bounds of constructing k-mins and bottom-k sketches for two representative classes of applications. We show that when subsets are represented explicitly (each occurrence of an item in a subset is specified), it is much more efficient to construct bottom-k sketches. We review this point for uniform weights and extend the analysis for weighted items. For implicit representation of the subsets, via a graph, we show that the time bounds for generating the two types of sketches are comparable. As used herein, the phrase type means a number of things having in common traits or characteristics that distinguish them as a group or class.

Examples of applications with explicit specification are. Among these are market-basket data, Web duplicate analysis and more.

To construct a k-mins sketch for a subset, we maintain a current sketch $(m_1, \ldots, m_k)$ of the smallest rank value observed so far for each of the k rank functions (along with attributes of the items with smallest rank). Initially, $m_j = +\infty$ for $(j=1, \ldots, k)$. When an item i is processed we compute $r^{(1)}(i), r^{(2)}(i), \ldots, r^{(k)}(i)$. We then update the sketch so that $m_j \leftarrow \min\{m_j, r^{(j)}(i)\}$. Therefore, the processing time for each occurrence of an item in a subset is $\Theta(k)$ (it is $\Theta(k)$ time for both the test and update operations).

To construct a bottom-k sketch, we use a current sketch that contains the k smallest rank values observed so far $m_1 < m_2 \ldots < m_k$ as a sorted list. When an item i is processed, we compute $r(i)$, which is compared to $m_k$ (test operation). If $r(i) < m_k$, the rank value $m_k$ (and corresponding item) is deleted from the list and $r(i)$ is inserted (update operation). A test operation takes $O(1)$ time and an update takes $O(\log k)$ time.

Therefore, the time bound for generating a sketch for a subset of size s is $O(sk)$ for a k-mins sketch and $O(s \log k)$ for a bottom-k sketch. We next show that for uniform weights the expected number of update operations while constructing a bottom-k sketch of a set of size s is $O(k \log s)$. This implies a better bound of $O(s+k \log s \log k)$ on the expected running time to generate a bottom-k sketch.

Lemma 3. If items have uniform weights then the expected number of updates to a bottom-k sketch of a set of size s is $\leq k \ln s$.

Proof. A presented item triggers an update of the current sketch if and only if it has one of the bottom-k ranks among items presented so far. If j items were presented so far, the probability of that happening is $\min\{1, k/j\}$. Summing over all positions in the presentation order we obtain that the expected number of updates is at most $$\sum_{j=1}^{s} k/j \approx k \ln s.$$

For weighted items we consider two cases. First is the case where items are presented in an order determined by a random permutation.

Lemma 4. If items are presented in random order then the expected number of updates to a bottom-k sketch of a set of size s is $\leq k \ln s$.

Proof. Fix the rank assignment. The probability that the j th item in the presentation order has one of the $k^{th}$ smallest ranks of the first j items is $\min\{1, k/j\}$. Continue as in the proof of Lemma 3.

From Lemma 4 it follows that if items are weighted and are presented in random order, the bottom-k sketch is constructed in $O(s+k \log k \log s)$ expected time.

To bound the number of updates when items are presented in an arbitrary order we need the rank assignment to define a "close" to random permutation of the items if weights are, say, within a factor of two from each other. This will hold if the rank functions satisfy the following property. As used herein, the phrase will means going to.

Definition 3. A family of rank functions is c-moderate if for any $w>0$, and $0<w'\leq 2w$, there is probability at least $$\frac{1}{c}$$

such that an item drawn according to $f_{w'}$ has a larger rank than an item drawn according to $f_w$.

If the family of rank functions is c-moderate for some constant c and the weights of all items are within a factor of two from each other then the probability that a rank of a particular item, say i, is among the k-smallest ranks is at most $$c\frac{k}{j},$$

where j is the number or items. To see that, replace item i by $\lceil c \rceil$ duplicates, consider a random permutation of the new set of items and the probability that one of the duplicates is among the bottom-k. This probability is smaller than $$c\frac{k}{j}$$

and larger than the probability that item i is among the bottom k. One can check that exponential ranks are 3-moderate and priority ranks are 4-moderate.

Lemma 5. If items are weighted and presented in arbitrary (worst-case) order, and the family of rank functions is c-moderate for some constant c, then the expected number of updates of the bottom-k sketch of a set of size s is $O(k \log(\max_i w(i)/\min_i w(i)) \log s)$.

Proof. Consider a partition of the items into $$\lceil \log(\max_i w(i) / \min_i w(i)) \rceil$$

groups according to the weight, so that items of weight $$[2^i \min_i w(i), 2^{i+1} \min_i w(i)]$$

are in the same group. We bound the number of updates within one group. From the fact that the rank assignment is c-moderate it follows that the probability of the j th presented item in a group to be within the bottom-k items presented so far from its group is at most $ck/j$, and hence, the expected number of updates within a group is at most $ck \ln s$. The statement of the lemma follows by summing over all groups.

From Lemma 5 it follows that if weighted items are presented in arbitrary order, and the set of rank functions is c-moderate for some constant c, then we build the bottom-k sketch in
$O(s+k \log(\max_i w(i)/\min_i w(i)) \log s \log k)$ expected time.

In some applications, items and locations are embedded in a graph or a metric space and subsets correspond to all items in a certain neighborhood or the reachability set of a node. The computation of the sketches is performed concurrently for all subsets, with items and ranks being propagated in a controlled way such that an item is tested for a subset only if it is "fairly likely" to occur in the sketch of the subset and the number of test operations is much smaller than with an explicit representation.

We review the computation of sketches for reachability sets of nodes in a graph. In this application each node is an item. Each node computes the sketch of its reachability set. Rank values (and associated information) are propagating using a graph traversal method such as breadth-first or depth-first search. When a rank value does not result in an update at a node, the propagation of the rank value is halted at that node. Therefore, the number of test operations is at most (m/n) times the number of update operations, where m is the number of edges and n the number of nodes.

For k-mins sketches, each item and a rank value associated with it are propagated separately (therefore, k truncated traversals are performed for each item). If, within each rank assignment, items are propagated in increasing rank order, then the combined number of updates for all subsets is n. As used herein, the phrase increase means to become greater or more in size, quantity, number, degree, value, intensity, and/or power, etc. Therefore, the total number of updates, for all k rank assignments and subsets is O(kn) and the number of tests (and total time) is O(km).

Bottom-k sketches are computed by propagating each item and its associated rank using a truncated graph traversal (note that in contrast to k-mins sketches, one traversal is performed for each item). The current sketch at a node is updated when an item arrives and its rank value is smaller than the k th smallest current rank at the node. The traversal is halted at nodes where the item did not result in an update of the current sketch. When items are presented in increasing rank order, then items can only be appended to bottom-k sketches and it is never necessary to remove an item. Therefore, the total number of updates is O(kn) and the total number of tests (and total time) is O(km). These bounds are the same as the bounds obtained for k-mins sketches.

When items are not presented ordered by their ranks, the number of update operations increases. Similarly to Lemma 3 and Lemma 5, Lemma 6 can be proven.

Lemma 6. Suppose we maintain the minimum rank in a subset of sizes. Then:

if items have uniform weights and presented in a fixed but arbitrary order or if items are weighted and presented in a random order, the expected number of updates to the minimum rank is $\leq \ln s$; and if items are weighted and presented in a fixed but arbitrary order and the family of rank functions is c-moderate, the expected number of updates is $O(\log(\max_i w(i)/\min_i w(i)) \log s)$.

It follows that the total number of updates when computing k-mins sketches of all reachability sets is $O(kn \log n)$ for uniform weights and weighted items presented in random order and $O(kn \log(\max_i w(i)/\min_i w(i)) \log n)$ for weighted items presented in arbitrary order. We perform a test or update in O(1) time and the number of tests is at most m/n times the number of updates. Therefore, the total time is m/n times the number of updates.

The number of updates for bottom-k sketches is given in Lemmas 1, 2, and 4. Each update takes O(log k) time, and a test takes O(1) time. The number of tests is m/n times the number of updates. Therefore, the total time is O(log k+m/n) times the number of updates given in each of these lemmas.

An all-distances sketch is an encoding of plain sketches of all neighborhoods of a certain location q. For a given distance d, the sketch for the d-neighborhood of the location can be retrieved from the all-distances sketch.

We review k-mins all-distances sketches and introduce bottom-k all-distances sketches. We consider the size of the all-distances sketches, its construction time, and the time it takes to retrieve the sketch of a particular distance. We consider incremental construction, where current all-distances sketches are maintained and updated upon the arrival of new information (item, distance, rank). The operations we consider are test that determines if the current sketch needs to be modified when new information arrives, update of the current sketch, and a distance query issued to the final sketch. The distance query retrieves from the all-distances sketch the plain sketch for the neighborhood of the location q specified by the query distance.

We show that the expected size of the representation of the all-distances bottom-k sketch matches that of the k-mins sketch. When subsets are represented explicitly, the computation time of the all-distances bottom-k sketches is about factor of k faster than that of the all-distances k-mins sketches. When subsets are represented via a graph, the construction times are comparable.

All-distances k-mins sketches: We review all-distances k-mins sketches. Consider a single rank assignment. An MV/D list of a location q (Minimum Value/Distance List) encodes the minimum rank in any neighborhood (query distance) of q in a compact way. It is a list of triples where each triple contains an item e, its rank, and its distance from q. An item e is in the MV/D list of q if there is no item with smaller rank closer to q. The MV/D list is sorted in increasing distance and decreasing rank order. For a query distance d, the smallest rank of an item in the MV/D list of q of distance at most d from q is the item of smallest rank in the subset of items in the d-neighborhood of q. The expected size of the list depends on the rank function and on the weight distribution of the items.

Lemma 7. The size of an MV/D list of n weighted items from a location q is bounded as follows:

when weights are uniform, the expected size is O(log n);

if weights are arbitrary but items are assigned to locations at random then the expected size over assignments of items to locations, and over rank assignments is O(log n); and if items have arbitrary weights and placed in arbitrary locations and ranks are assigned using a c-moderate family of rank functions for some constant c, then the expected size is $O(\log(\max_i w(i)/\min_i w(i)) \log n)$.

Proof. Fix the rank assignment. Order the locations in increasing distance from q. The assignment of items to location defines a random permutation of the ranks. Therefore, the probability that the rank value in location j is smaller than the rank values in all closer locations (and therefore the item occurs on the MV/D list) is 1/j.

By summing over all positions, we obtain that the expected size of the MV/D list is $$\sum_{j=1}^{n} 1/j \approx \ln n.$$

If the relation of the weights and the locations of items is arbitrary, the expected size of the MV/D lists depends on the location of items: If item weights are decreasing with distance then the expected size of the MV/D list is smaller and if item weights are increasing with distances, then the expected size is larger (can be linear in the worst case). The worst-case size of the MV/D list, however, can be bounded by the weight distribution of the items. The proof of the following lemma is similar to that of Lemma 5.

Lemma 8. If items have arbitrary weights and placed in arbitrary locations and ranks are assigned using a c-moderate family of rank functions for some constant c, the expected size of the MV/D list is $O(\log(\max_i w(i)/\min_i w(i))\log n)$.

Proof. Let $w_1 = \min_i w(i)$. Consider a partition of the items so that all items with weight in $[w_1 2^i, w_1 2^{i+1})$ are in group i, for $i = 0, \lfloor \log_2(\max_i w(i)/\min_i w(i)) \rfloor$. By the property of c-moderate rank functions, the expected number of items from each group that appear on the MV/D list is logarithmic in its size. Therefore, the total expected number of items on the MV/D list is bounded by $$2 \ln n \left(1 + \ln\left(\max_i w(i) / \min_i w(i)\right)\right).$$

The MV/D list can be constructed incrementally: When presented with a new item, its rank, and distance, the list is updated only if the new item has smaller rank than all items on the list that have the same or smaller distance. If items are presented in order of increasing rank, (or increasing (distance, rank) in lexicographic order), then items are never removed from the list during updates. Other orders of presenting items can be used and/or analyzed. We summarize and extend these results in the following lemma.

Lemma 9. Assume that we construct an MV/D list of a location q, and there are n weighted items. Then:
when items are presented in random order and there are uniform weights, the expected number of updates is $O(\log^2 n)$;
if items are assigned to locations at random, the expected number of updates to the MV/D list, over assignments of items to locations, rank assignments, and presentation order of items is $O(\log^2 n)$; and
if ranks are assigned using a c-moderate family of rank functions for some constant c, then the expected number of updates to the MV/D list, over rank assignments, and presentation order of items is $O(\log(\max_i w(i)/\min_i w(i))\log^2 n)$.

All-distances bottom-k sketches: An all-distances bottom-k sketch encodes the bottom-k items in a neighborhood defined by any query distance from a location q. The all-distances bottom-k sketch is a data structure that generalizes a single MV/D list. An item i, its rank value r(i), and distance d(i) are represented in the sketch if and only if the item has one of the bottom-k ranks in the d(i)-neighborhood of the location.

It is convenient to think of the all-distances bottom-k sketch as a list of lists arranged by increasing distance. For each distance d where the set of bottom-k items within distance d changes, we record the list of bottom-k items within this distance. As used herein, the phrase record means a collection of structured data elements organized by fields. A group of records forms a file, table, and/or database. For example, a record might comprise data elements stored in fields such as: a name field, an address field, and a phone number field. This list is valid until the next distance for which there is a change.

The list of lists representation, however, is not storage efficient, since all but one item is repeated in two consecutive lists. This sketch can be more compactly represented if we only record the changes to the list. Certain exemplary embodiments can utilize relatively compact representations for an all-distances bottom-k sketch that utilize storage proportional to the number of distances where the bottom-k set changes.

We bound the number of distances for which the bottom-k list changes. These bounds imply that the storage for an all-distances bottom-k sketch is comparable to the storage for k MV/D lists in all-distances k-mins sketch.

Lemma 10. Consider an all-distances bottom-k sketch for n items of a location q. We bound the expected number of distances from q where the set of bottom-k items changes.
for uniform weights, the expected number of distances is $O(k \log n)$;
for a set of items with arbitrary weights that are randomly assigned to locations the expected number of distances (over assignments of items to locations, and over rank assignments) is $O(k \log n)$; and
if items have arbitrary weights and placed in arbitrary locations and ranks are assigned using a c-moderate family of rank functions for some constant c, the expected number of distances is $O(k \log(\max_i w(i)/\min_i w(i))\log n)$.

Proof. Order the items by increasing distance from q. Let d(j) be the distance of the j th item in this order from q. The j th item is in the bottom-k set of items within distance d(j) from q if it is one of the k-smallest items among the j closest items to q. Since weights are uniform, the ranks define a random permutation of the items which is independent of the distances to q. So the j th item is among the smallest k with probability min{k/j, 1}. Summing over all items we obtain that the expected number of items which are among the k th smallest items within their distance from q is at most $$\sum_j \frac{k}{j} \approx k \ln n$$

As in Lemma 3, and 5 for weighted items we can show the following.

Lemma 11.
For a set of items with arbitrary weights and a set of locations, the expected number of distances from a location q where the set of bottom-k items changes, over assignments of items to locations, and over rank assignments is $O(k \log n)$.

If items have arbitrary weights and placed in arbitrary locations and ranks are assigned using a c-moderate family of rank functions for some constant c, the expected number of distances from a location q where the set of bottom-k items changes is $O(k \log(\max_i w(i)/\min_i w(i))\log n)$.

If items are presented in order of increasing distances from q we can obtain a bottom-k list for the current distance, from the bottom-k list of the previous distance by doing an insertion and a deletion. Similarly, if items arrive sorted by rank value, then the number of updates to the bottom-k sketch is proportional to the size (number of breakpoint distances) of the sketch. We can also bound the number of updates performed if items arrive in a random order.

Lemma 12. Consider the expected number of updates that is performed in an incremental construction of an all-distances bottom-k sketch of a location q when items are presented in a random order (the order is a random permutation):

when item weights are uniform, the expected number of updates is $O(k \log^2 n)$;

when items have arbitrary weights, the expected number of updates over assignments of weights to locations, over rank assignments, and arrival order, is $O(k \log^2 n)$; and when items have arbitrary weights, and the family of rank functions is c-moderate, the expectation over rank assignments and arrival orders of the number of updates is $O(k \log(\max_i w(i)/\min_i w(i))\log^2 n)$.

Proof. Consider uniform weights. An item would result in an update if, at the time it is presented, it has one of the k smallest ranks amongst items already presented that are at least as close to q. Consider the j th closest item to q. It has probability 1/j of having the i th rank among all items that are at least as close to the location. As used herein, the phrase having means possessing. We now calculate the probability that the item results in an update given that it has the i th rank. As used herein, the phrase calculate means to compute. Consider the i−1 items that have smaller ranks and are at least as close. The probability that at most k−1 of them are presented before our item is that of being in one of the first k positions in a random permutation of i items, which is min{k/i,1}. We obtain that the expected number of updates for the j th closest item is $$\sum_{i=1}^{j} \min\{k/i, 1\}/j \le (1/j)\sum_{i=1}^{j} k/i \approx (k/j) \ln j.$$

summing over all n items, we obtain that the expected number of updates is $$\le \sum_{j=1}^{n} (k/j)\ln j \le k\ln^2 n.$$

The proof of the remainder of Lemma 12 follows by arguments analogous to the presented reasoning regarding Lemma 3, and Lemma 5.

As in the case of a single sketch, the number of test operations depends on the representation of the subsets. If this representation is explicit then since k-mins sketch consists of k independent MV/D lists the number of tests utilized for a k-mins sketch is by a factor of k larger than for a bottom-k sketch. In a graph representation, the number of tests is at most (m/n) times the number of updates for both kinds of sketches. In certain exemplary embodiments, representations of sketches allow efficient implementations of test and update operations.

We consider possible representations for k-mins sketches and bottom-k sketches. We are interested in bounding the size of the data structure that encodes the sketch, and the time utilized to incrementally construct the sketch when items are presented in sorted or other orders. For all-distances sketches we also consider the time it takes to find the sketch for a particular query distance.

Representation of an MV/D list: Certain exemplary embodiments provide an efficient data structure for an MV/D list construction and querying. If items arrive sorted, by increasing rank value or increasing distance, we represent an MV/D list sorted by increasing distances (and decreasing ranks), as a binary search tree. With this representation we can support distance queries in expected $O(\log M)$ time, where M is the expected size of the list.

If items do not arrive in a sorted order, we represent the current MV/D list as a dynamic binary search tree. Test operations then utilize expected $O(\log M)$ time. An update is performed in $O(\log M)$ expected amortized time: Each item utilizes an insertion to the tree if it has the smallest rank within its distance from the query location, and possibly a series of deletions of items which are further away from the query location and of larger rank. As used herein, the phrase further means in addition. Since each item can be deleted at most once, we can charge each deletion to the respective insertion.

The all-distances k-mins sketches consists of k independent MV/D lists, one for each rank assignment. Therefore, for any query distance, we can obtain the min-rank sketch over the items that lie within that distance in $O(k \log M)$ time, by searching independently in each of the k lists. The query time can be improved to $O(k+\log M)$ using fractional cascading. Using fractional cascading, we perform a binary search only on one list and use links between items to find the position in the next list is $O(1)$ time.

Another approach to obtain a $O(k+\log M)$ bound per query is to use an interval tree or a segment tree to represent the kM intervals defined by consecutive points on the same list. We can then do stabbing queries to find the k intervals of a query distance, which correspond to the min-rank in that neighborhood in each of the k rank functions.

Constructing and querying the bottom-k sketch: A natural representation for a single bottom-k sketch is a list of the items sorted by increasing ranks represented as a search tree. However for all-distances bottom-k sketch one needs to be more careful so that the size of the representation would be proportional to the number of distances where the list changes. We suggest possible efficient representations for an all-distances bottom-k sketch.

Ordered insertion of items: When items are presented in an order related to their distances or ranks, we can use the following data structures.

If items are presented in order of increasing distances from q we can obtain a bottom-k list for the current distance, from the bottom-k list of the previous distance by doing an insertion and a deletion. If we use a persistent list to represent each bottom-k list, then we can update a bottom-k list to obtain the next one in O(k) time while consuming only O(1) space. We can reduce the update time to O(log k) by using persistent search trees instead of persistent lists; the space utilized per operation is still O(1).

We can also construct the bottom-k all-distances sketch if items are presented in order of increasing ranks so that it takes space proportional to the number of updates. We construct the first list after the k items with smallest ranks are presented. This list is associated with the distance of the item among these k which is furthest from the query location q. When the next item arrives, say item j, if item j is closer to q than any of the already seen items; we construct a new bottom k list L. Assume that the previous list L' which we constructed was associated with distance d>d(j). We construct L from L' by deleting from L' the item at distance d from q and adding item j instead. The distance associated with L is the distance of the furthest item in L from q. Using persistent lists or persistent search trees to represent the bottom-k lists we construct all lists in space which is proportional to the number of updates. The update time is O(k) with persistent lists and O(log k) with persistent trees (we keep the items in each list sorted by increasing distances from q).

Insertion of items in arbitrary order: To support arbitrary insertion order, we can think of the all-distances bottom-k sketch as a set of intervals on a line. Each item corresponds to an interval over the range of distances in which it is a bottom-k item. Let D be the current set of intervals. A query is a point stabbing query; the bottom-k list consists of the set of intervals in D intersecting the query point.

When a new item z arrives at distance d we should figure out if the sketch should be updated. Let $I_1=[d_1, d_2)$ be the interval spanning distance d with the largest rank. We should update the sketch if the rank of z is smaller than the rank of the item corresponding to $I_1$. We update the sketch as follows. We replace with $I_1=[d_1,d)$. Then we find the interval $I_2=[d_2, d_3)$ with largest rank at distance $d_2$. If the rank of $I_2$ is larger than the rank of z we delete $I_2$, and we continue in the same way finding for i>2 the interval $I_i$ of largest rank at distance $d_i$, and deleting $I_i$ if the rank of the corresponding item is larger than the rank of z. Let $d_j$ be the right endpoint of the last interval which we deleted. We insert the interval $[d, d_j)$ corresponding to item z. Since each interval is inserted and deleted once the total number of insertions and deletions of intervals is proportional to the number of intervals. An interval I may split many times. However, each split of I is associated with a newly inserted interval immediately following I. Since each inserted interval may cause at most one split the total number of splits is also proportional to the total number of intervals.

To support these interval operations, we can maintain the intervals either in a dynamic interval tree or in a dynamic segment tree. Let M denote the number of intervals in the tree. A dynamic interval tree takes O(M) space, and using it we can report the k intervals stabbed at a particular distance in O(log(M)log(k)+k) time. We can update an interval tree in O(log(M)log(k)) amortized time. A dynamic segment tree utilizes O(M log M) space and supports queries in O(log(M)+k) time and updates in O(log(M)log(k)) amortized time.

By a standard modification to an interval tree in which we store at every secondary node the item of maximum rank in its subtree we can find the interval of maximum rank stabbed by a query distance in O(log(M)log(k)) time. Similarly, by maintaining at each node of a segment tree the maximum rank interval that it contains we can find the maximum rank interval stabbed by a query distance in O(log(M)) time. This allows us to test if the bottom-k sketch changes when a new item arrives in polylogarithmic time (This is in contrast with O(k log(n)) time for k independent MV/D lists that form a k-mins all distances sketch).

We present a randomized procedure that uses a ws-sketch (weighted sampling without replacement until k items are obtained) to emulate weighted sampling with replacement. Using this process, we can derive a size-k wsr-sketch from a size-k ws-sketch. By mimicking we mean that the probability to obtain a particular sketch by first obtaining a ws-sketch and then applying the procedure is the same as when directly obtaining a wsr-sketch.

The process is described as generating a sequence of items (and rank values). The process is randomized and therefore every ws-sketch b corresponds to a distribution M(b) over such sequences. If we stop the process after k samples, we obtain a wsr-sketch. We can use a different stopping rule and continue until the (k+1) distinct item is sampled. We refer to a weighted sample with replacement with this stopping rule as a wsrd-sketch. The wsrd-sketch contains the same set of items as the ws-sketch but also has a count for each item that corresponds to the number of times the item is sampled until the process is stopped.

Mimicking allows us to apply an estimator v designed for wsr-sketches or wsrd-sketches to ws-sketches. A ws-sketch estimator can be obtained by drawing a mimicked sketch s∈M(b) using this process and returning v(s). This estimator is equivalent to using the estimator v on wsr or wsrd-sketches.

The estimator $v'(b)=E(v(s)|s \in M(b))$ has lower variance (a consequence of Lemma 1). It can be approximated by taking average of v(s) over multiple draws of s∈M(b). This "approximation" preserves unbiasedness.

Lower variance estimator (another consequence of Lemma 1) is obtained by considering the subspace L(b) of ws-sketches with the same subset of items as b and if w(J) is not provided and the same rank value $r_{k+1}$. L(b) is an equivalence relation that defines a partition of the sample space. The estimator $v''(b)=E(v'(b')|b' \in L(b))$ can be approximated by averaging v(b') over multiple draws of b'∈L(b).

We first provide a mimicking process when the total weight w(I) of the ground set is known. Let $i_1, \ldots, i_k$ be the items in the ws-sketch b, ordered by increasing ranks. The first item in the mimicked sample is $i_1$. We then select $i_1$ with probability $w(i_1)/w(I)$ and $i_2$ otherwise, and repeat this until we have k samples or until $i_2$ is selected. In phase j, after outputting at least one sample of each $i_1, \ldots, i_j$, we select $i_l$ with probability $w(i_l)/w(I)$ (for $1 \leq l \leq j$) and $i_{j+1}$ otherwise. As used herein, the phrase output means (n) something produced and/or generated; data produced by an information device executing machine-readable instructions; and/or the energy, power, work, signal, and/or information produced by a system. (v) to provide, produce, manufacture, and/or generate. Each phase can be simulated efficiently using the geometric distribution to determine the number of samples until the "next" item from b is sampled and the multinomial distribution to determine the number of times each item is sampled.

We now provide a mimicking procedure when w(I) is not known. The procedure is applied to an ordered sketch where all items have rank values.

We use properties of the exponential distribution and the ranks of the items in the ws-sketch. We first establish few lemmas about the distribution of the differences between the ranks of the items in a ws-sketch. The first lemma follows from the memoryless nature of the exponential distribution.

Lemma 13. Consider a subspace of rank assignments where the order of the items according to rank values is fixed, say $i_1, \ldots, i_n$, and the rank values of the first j items are fixed. Let $r(i_{j+1})$ be the random variable that is the (j+1) st smallest rank. The conditional distribution of $r(i_{j+1})-r(i_j)$ is exponential with parameter $$\sum_{h=j+1}^{n} w(i_h).$$

Proof. Since rank values of different items are independent, the probability density for the event: items $i_1, \ldots, i_j$ have the bottom-j ranks with the values $r(i_1) < \ldots < r(i_j)$ and items $i_{j+1}, \ldots i_n$ having the next n−j smallest ranks in that order is the product $p_1 p_2$ where $$p_1 = w(i_1)\exp(-r(i_1)w(i_1))w(i_2)\exp(-r(i_2)w(i_2)) \ldots w(i_j)\exp(-r(i_j)w(i_j))$$

(probability density that the items $i_1, \ldots, i_j$ have the rank values $r(i_1), \ldots, r(i_j)$) and $$p_2 = \int_{r(i_j)}^{\infty} w(i_{j+1})\exp(-x_{j+1}w(i_{j+1})) \cdot \int_{x_{j+1}}^{\infty} w(i_{j+2})\exp(-x_{j+2}w(i_{j+2})) \ldots \int_{x_{n-1}}^{\infty} w(i_n)\exp(-x_n w(i_n))dx_n \ldots dx_{j+2}dx_{j+1}.$$

is the probability density that items $i_{j+1}, \ldots, i_n$ have rank values in that order and all larger than $r(i_j)$. Performing the integration, we obtain that $$p_2 = p_3 \exp\left(-r(i_j) \sum_{h=j+1}^{n} w(i_h)\right),$$

where $$p_3 = \frac{w(i_{j+1})}{\sum_{h=j+1}^{n} w(i_h)} \frac{w(i_{j+2})}{\sum_{h=j+2}^{n} w(i_h)} \ldots \frac{w(i_{n-1})}{w(i_{n-1})+w(i_n)}.$$

($p_3$ is the probability that the rank values of items $i_{j+1}, \ldots, i_n$ are in that order and $$\exp\left(-r(i_j)\left(\sum_{h=j+1}^{n} w(i_h)\right)\right)$$

is the probability that the minimum rank among $i_{j+1}, \ldots, i_n$ is at least $r(i_j)$.) Therefore, the probability density is $$p_1 p_2 = p_1 p_3 \exp\left(-r(i_j) \sum_{h=j+1}^{n} w(i_h)\right). \tag{1}$$

We next calculate the probability density for the following event: items $i_1, \ldots, i_n$ have increasing ranks, the bottom-j ranks are equal to $r(i_1) < \ldots < r(i_j)$, and the (j+1) st rank has value $r(i_j)+d$. It follows from independence of the rank values that the probability density is $$p_1 w(i_{j+1})\exp(-(r(i_j)+d)w(i_{j+1})) \int_{r(i_j)+d}^{\infty} w(i_{j+2}) \tag{2}$$

$$\exp(-x_{j+2}w(i_{j+2})) \ldots \int_{x_{n-1}}^{\infty} w(i_n)\exp(-x_n w(i_n))dx_n \ldots dx_{j+2} =$$

$$p_1 w(i_{j+1})\exp(-(r(i_j)+d)w(i_{j+1}))\exp\left(-(r(i_j)+d)\sum_{h=j+2}^{n} w(i_h)\right)$$

$$\frac{w(i_{j+2})}{\sum_{h=j+2}^{n} w(i_h)} \ldots \frac{w(i_{n-1})}{w(i_{n-1})+w(i_n)} = p_1\left(\sum_{h=j+1}^{n} w(i_h)\right)$$

$$\exp\left(-(r(i_j)+d)\sum_{h=j+1}^{n} w(i_h)\right)\frac{w(i_{j+1})}{\sum_{h=j+1}^{n} w(i_h)}\frac{w(i_{j+2})}{\sum_{h=j+2}^{n} w(i_h)}$$

$$\ldots \frac{w(i_{n-1})}{w(i_{n-1})+w(i_n)} = p_1 p_3 \exp\left(-r(i_j)\sum_{h=j+1}^{n} w(i_h)\right)$$

$$\left(\sum_{h=j+1}^{n} w(i_h)\right)\exp\left(-d\sum_{h=j+1}^{n} w(i_h)\right).$$

The density function of the conditional probability distribution in the statement of the lemma equals to the ratio of Eq. (2) and Eq. (1). This ratio is $$\left(\sum_{h=j+1}^{n} w(i_h)\right)\exp\left(-d\sum_{h=j+1}^{n} w(i_h)\right),$$

which is the probability density of the exponential distribution with parameter $$\sum_{h=j+1}^{n} w(i_h) \text{ at } d.$$

In the following corollary we relax the conditioning of Lemma 13 to what we need.

Corollary 1. Consider a probability subspace of rank assignments such that the permutation of the first k items as determined by the rank order is fixed to be $i_1, i_2, i_3, \ldots, i_k$. Let $r(i_1) < r(i_2) < \ldots < r(i_k) < r(i_{k+1})$ be the random variables that are the smallest k+1 ranks. The rank differences $r(i_1), r(i_2)-r(i_1), \ldots, r(i_{k+1})-r(i_k)$ are independent random variables, where $r(i_j)-r(i_{j-1})$ (j=1, \ldots, k+1) is exponentially distributed with parameter $$w(J) - \sum_{l=1}^{j-1} w(i_l).$$

(we formally define $r(i_0)=0$.)

The ws-sketch provides the k-prefix of the random permutation defined by the ranks. By Corollary 1 the rank differences $r(i_j)-r(i_{j-1})$ are k independent samples where the j th sample is from an exponential distribution with parameter $$w(J) - \sum_{h=1}^{j-1} w(i_h),$$

for i=1, ..., k. The following lemma (which states a basic property of the exponential distribution) allows us to transform an exponentially distributed random variable drawn with parameter A–a, where A≧0 is not known but a A≧a≧0) is known, to an exponentially distributed random variable with parameter A.

Lemma 14. Let a be an exponentially distributed random variable with parameter A. Let r be an independent exponentially distributed random variable with parameter B–A (for some B>A). Then the random variable min{a, r} is exponentially distributed with parameter B.

Let $i_1, \ldots, i_k$ be the items in the sketch in increasing rank order.

The first entry of the mimicked sketch contains the item $i_1$ with rank value $r(i_1)$.

Suppose items $i_1, \ldots, i_j$ (j≧1) are drawn (at least once). The next entry is obtained as follows:

we draw exponentially distributed values $r'_{j,l}$ from distributions with parameters $w(i_l)$ (for 1≦l<j);

if $\min_{1 \leq l < j} r'_{j,i} \geq r(i_j) - r(i_{j-1})$ we use the item $i_j$ with rank value $r(i_j)-r(i_{j-1})$; and otherwise, let $m = \arg\min_{1 \leq l \leq j} r'_{j,l}$ and use the item $i_m$ and the rank value $r'_{j,m}$.

When implementing this process, we can use a geometric random variable (with parameter equal to the probability that an exponential random variable with parameter $$\sum_{h=1}^{j} w(i_h)$$

is at most $r(i_j)-r(i_{j-1})$) to determine the number of draws until another distinct items is sampled and multinomial random variables to determine the number of items each item is sampled.

The following lemma summarizes the basic property of this randomized process. Its correctness follows from Corollary 1 and Lemma 14.

Lemma 15. The mimicked sketches have the following property: For a subset J, the following actions yield the same distribution over sketches.

Draw items using weighted sampling with replacement and assign independent rank values from an exponential distribution with parameter w(J) until: k samples are obtained (for mimicked wsr-sketches) or the (k+1) st distinct item is sampled (for mimicked wsrd-sketches).

Generate a rank assignment and obtain the corresponding ws-sketch b of size k. Draw a mimicked sketch from M(b).

Generate a rank assignment and obtain the corresponding ws-sketch b of size k. Draw a ws-sketch b'∈L(b). Draw a mimicked sketch from M(b').

Consider a set J∈I and a ws-sketch b of size k. Let $i_1, i_2, \ldots, i_k$ be the items in b and $r(i_1) < \ldots < r(i_k)$ be their rank values. We consider the problem of estimating w(J) from the sketch b. If the cardinality of the set J is at most |J|<k then the ws-sketch contains all the elements of the subset (and we can determine this) and we can compute $w(J) = \Sigma w(i_j)$. When |J|≦k, we apply the estimator to the mimicked sketch.

The ranks in a WSR-sketch are k independent exponentially distributed random variables with parameter w(J). This property was used in to obtain sketch-based estimators for w(J): If $v_1, \ldots, v_k$ are independent and exponentially distributed with parameter w(J) then $$\frac{k-1}{\sum_{h=1}^{k} v_h}$$

is an unbiased estimator of w(J) with standard deviation equal to $w(J)/\sqrt{k-2}$ and average (absolute value of the) relative error approximately. $\sqrt{2(\pi(k-2))}$.

$$\frac{\sum_{h=1}^{k} v_h}{k}$$

is an unbiased estimator of 1/w(J) with standard deviation $1/(\sqrt{k}w(J))$.

The wsrd mimicking process produces 1≦k independent random variables $v_1, \ldots, v_l$. The number 1≧k is a random variable that is independent of the values. It is not hard to see that if k>1, $$\frac{l-1}{\sum_{h=1}^{l} v_h}$$

is an unbiased estimator of w(J) and if k>2, its standard deviation is at $$\frac{\sum_{h=1}^{l} v_h}{l}$$

most $w(J)/\sqrt{k-2}$. Similarly, is an unbiased estimator of 1/w(J) with standard deviations at most $1/(\sqrt{k}w(J))$.

FIG. 1 is a block diagram of an exemplary embodiment of a set if graphs indicative of absolute relative errors in estimated parameters as a function of sketch size for various sketches.

Figure 2:
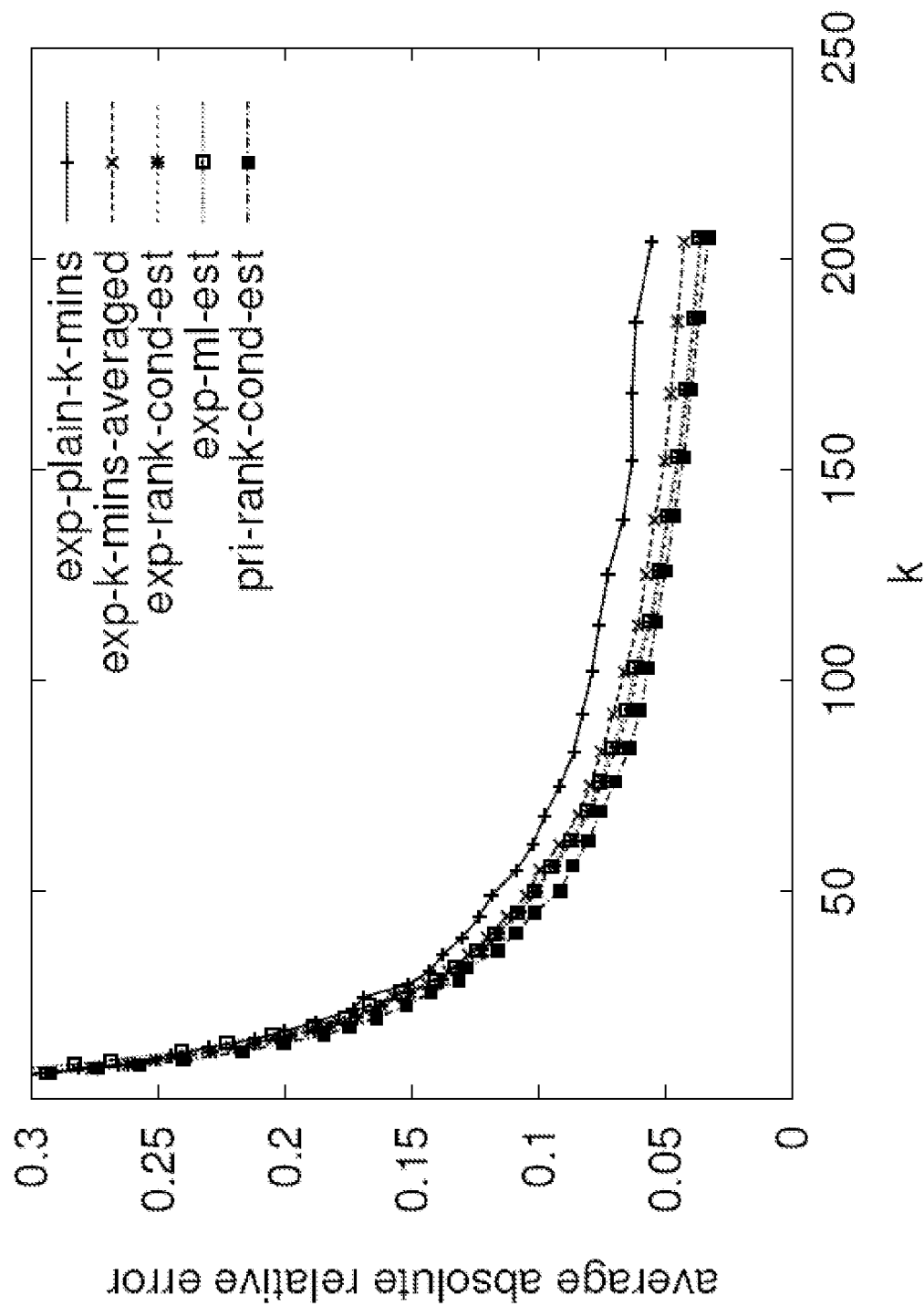
FIG. 2 is a block diagram of an exemplary embodiment of a set if graphs indicative of absolute relative errors in estimated parameters as a function of sketch size for various sketches.

FIG. 2 is a block diagram of an exemplary embodiment of a set if graphs indicative of absolute relative errors in estimated parameters as a function of sketch size for various sketches.

FIG. 1 and FIG. 2 show the (absolute) relative error of different estimators, averaged over 1000 runs. Bottom-k estimators perform better than the k-mins WSR-sketches estimator. These tailored bottom-k estimators are derived as exponential ranks and priority ranks FIG. 1 and FIG. 2 show an average relative error of estimators on item weights for 1000 items drawn from Pareto distributions with $\alpha=0.9$ and $\alpha=1.3$. The estimators shown are the plain k-mins (WSR-sketches), the k-mins averaged (on WS-sketch b, averaged over NM) but not over L(b)), and some tailored bottom-k estimators.

The Selectivity of a subpopulation $J' \in J$ is $w(J')/w(J)$, that is, the weighted fraction of the J' items included in J.

An important application of selectivity is computing the resemblance of two subsets, defined as $w(A \cap B)/w(A \cup B)$ from their sketches. (Resemblance generalizes the binary Jaccard coefficient). The resemblance is the selectivity of items in $A \cap B$ that are included in $A \cup B$: The sketch of $A \cup B$ can be obtained from the sketches of A and B (for both k-mins and bottom-k sketches). For each item in the sketch of $A \cup B$ we can determine if it is a member of A and of B (it is a member in A if it is in the sketch of A and symmetrically for B) and hence if it is a member of $A \cap B$. Mimicked sketches do not support subset relations, and therefore, when applying WSR or WSRD estimators we have to first compute the WS-sketch of the union and obtain a mimicked sketch of the union.

When items have uniform weights, an unbiased estimate of selectivity (and resemblance) can be obtained as follows. Using k-mins sketches, the estimator is the fraction of entries in the sketch that contain members of the subpopulation (for resemblance the fraction of identical entries in the sketches of A and B). Using bottom-k sketches, the estimator is the fraction of items in the sketch that are members of the subpopulation (fraction of items in the sketch of $A \cup B$ that are in $A \cap B$). The k-mins selectivity estimator carries over for weighted data: The fraction of entries that are members of the subpopulation is an unbiased selectivity estimator. We provide a simple example that demonstrates that this estimator is biased for bottom-k sketches when items are weighted. Consider a set of four items $(i_1, i_2, i_3, i_4)$ with weights $(4,1,1,1)$ and estimating the selectivity of $\{i_1\}$. (For resemblance, consider the subsets $\{i_1, i_2, i_3\}$ and $\{i_1, i_4\}$—the union contains all four items and the intersection contains only $\{i_1\}$. The selectivity is $4/7$. Consider k=2. The probability that $i_1$ appears (first or second) in the sketch is $4/7+(3/7)*(4/6)=6/7$ in that case, the respective fraction is $4/5$ (since the other item in the sketch has weight 1). Otherwise, $i_1$ does not appear in the sketch and the fraction is zero. Therefore, the expectation of the fraction is $(6/7)(4/5)>4/7$. If we use the fraction of entries instead of fraction of weights, we obtain $3/7<4/7$.

When the weight $w(J)$ is not provided, (for resemblance, we do not have the weight $w(A \cup B)$ even if we have $w(A)$ and $w(B)$), unbiased estimators for selectivity from WS-sketches do not follow from existing unbiased estimators for subpopulation size. Fortunately, unbiased selectivity (and resemblance) estimators can be obtained using mimicked sketches. An unbiased selectivity estimator for WSR-sketches (and also for WSRD-sketches) is the fraction of samples where the item is a member of the subpopulation. A WS-estimator is obtained by taking the expectation of this estimator over mimicked sketches. This is the only method we are aware of to obtain unbiased estimators of selectivity and resemblance from WS-sketches that have variance that is at most that obtained through a WSR-sketch.

Figure 3:
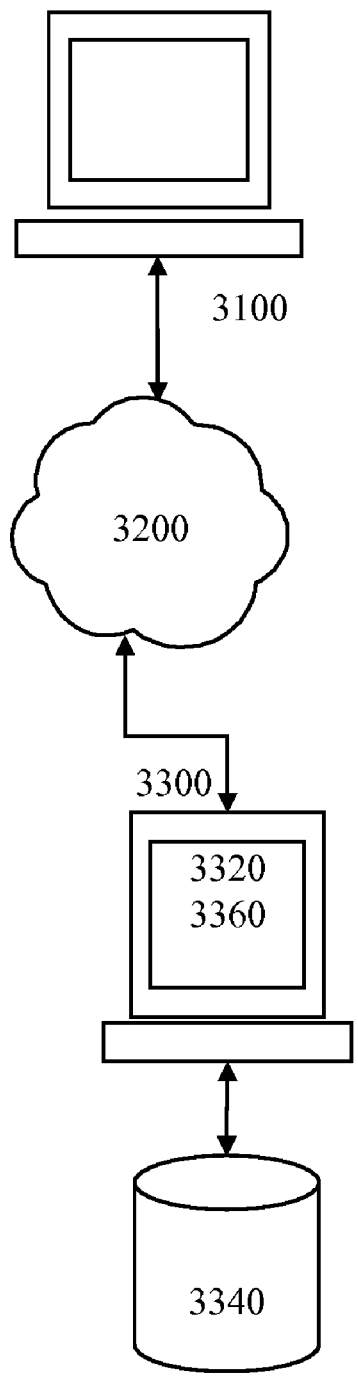
FIG. 3 is a block diagram of an exemplary embodiment of a system 3000.

FIG. 3 is a block diagram of an exemplary embodiment of a system 3000, which can comprise an information device 3100. As used herein, the phrase comprise means to include, but not be limited to, what follows. Information device 3100 can be communicatively coupled to a server 3300 via a network 3200. As used herein, the phrase couple means to join, connect, and/or link two things together. As used herein, the phrase network means a communicatively coupled plurality of nodes, communication devices, and/or information devices. Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof.

As used herein, the phrase router means a device adapted to direct traffic and/or determine the next network point to which a data packet should be forwarded enroute toward its destination. The router is connected to at least two networks and determines which way to send each data packet based on its current understanding of the state of the networks it is connected to. Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model. Flow records containing this information are collected at IP routers by tools such as Cisco's NetFlow (now emerging as an IETF standard). As used herein, the phrase collect means to accumulate and/or gather. Each flow record contains the number of packets and bytes of the flow. As used herein, the phrase packets means a collection of digital data comprised of information and an associated header transmitted over a packet-switching network.

Server 3300 can comprise and/or be communicatively coupled to a user program 3320, a user interface 3360, and a memory device 3340. As used herein, the phrase interface means (n) a boundary across which two independent systems meet and act on and/or communicate with each other. (v) to connect with and/or interact with by way of an interface. As used herein, the phrase memory device means an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein. Information device 3100 and/or server 3300 can be adapted to perform any method and/or activity described herein. In certain exemplary embodiments, user program 3320 can be adapted to analyze one or more datasets and/or derive one or more bottom-k sketches from a dataset. User interface 3360 can be adapted to render information regarding the dataset and/or a sketch derived therefrom.

Figure 4:
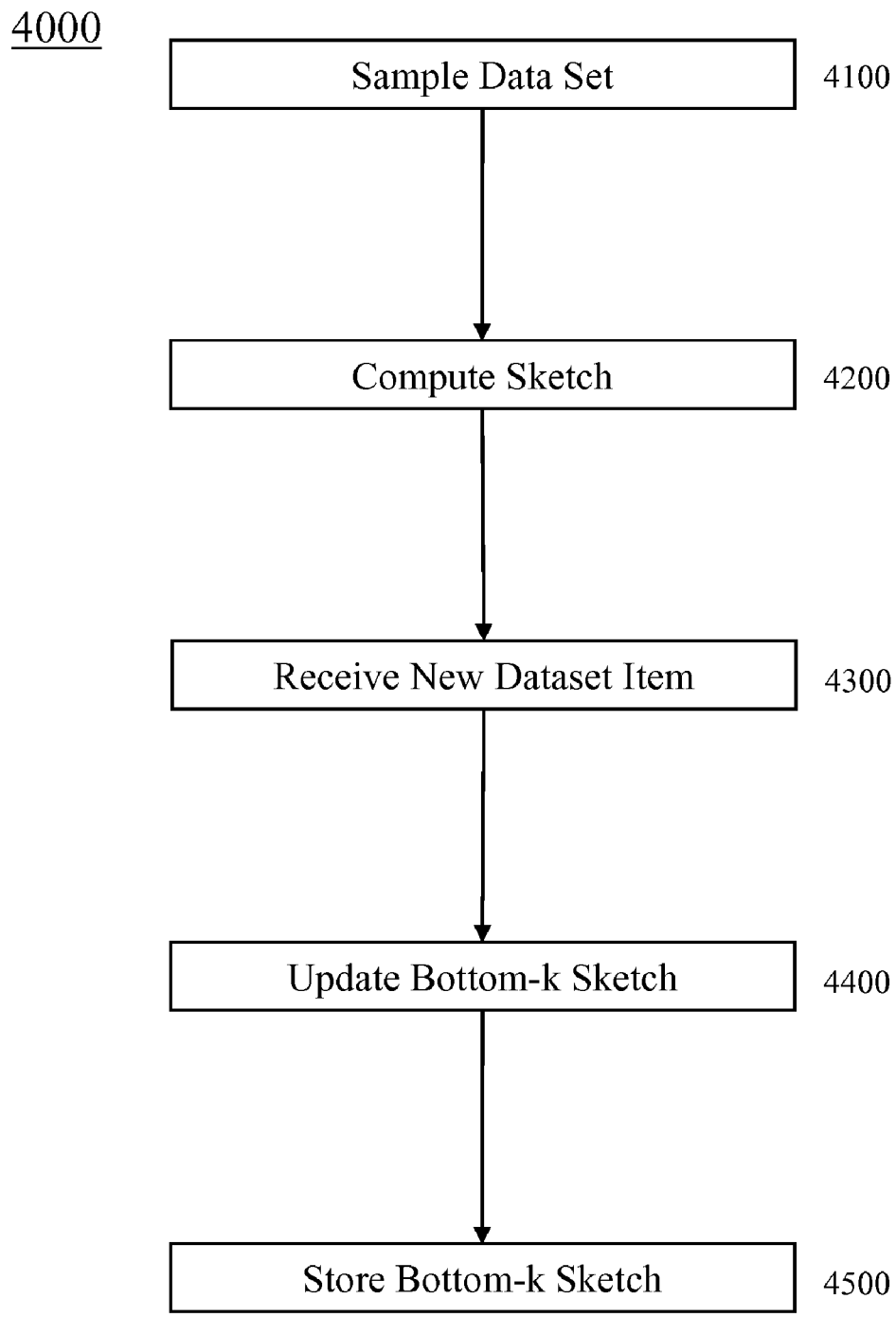
FIG. 4 is a flowchart of an exemplary embodiment of a method 4000.

FIG. 4 is a flowchart of an exemplary embodiment of a method 4000. As used herein, the phrase method means a process, procedure, and/or collection of related activities for accomplishing something. In certain exemplary embodiments, any activity and/or subset of activities of method 4000 can be performed automatically by an information device. As used herein, the phrase activity means an action, act, deed, function, step, and/or process and/or a portion thereof. As used herein, the phrase automatic means performed via an information device in a manner essentially independent of influence and/or control by a user. As used herein, the phrase automatically means acting and/or operating in a manner essentially independent of external human influence and/or control. For example, an automatic light switch can turn on upon "seeing" a person in its view, without the person manually operating the light switch. In certain exemplary embodiments, one or more activities of method 4000 can be performed via machine-implementable instructions stored on a machine-readable medium. As used herein, the phrase machine implementable instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. As used herein, the phrase machine-readable medium means a physical structure from which a machine, such as an information device, computer, microprocessor, and/or controller, etc., can obtain and/or store data, information, and/or instructions. Examples include memories, punch cards, and/or optically-readable forms, etc. At activity 4100, a dataset can be sampled.

At activity 4200, a sketch can be computed from the dataset. In certain exemplary embodiments, the sketch can be a bottom-k sketch and/or an all-distance bottom-k sketch. Calculation of the bottom-k sketch (or all-distances bottom-k sketch or k-mins sketch) can be integrated with the sampling of activity 4100. The computation of the sketch can define a result and/or a distribution of the sampling of activity 4100. In certain exemplary embodiments, the bottom-k data sketch can be an all-distance bottom-k sketch. The bottom-k sketch can be a coordinated sketch of a plurality of bottom-k sketches. The bottom-k sketch can comprise a single stored rank value. The ranks of the bottom-k sketch can be exponentially distributed. The bottom-k sketch can be defined with respect to a family of probability distributions that can be parametrized by weight. Exponential ranks (exponential distribution with parameter equal to the weight) can be an exemplary choice. Exponential ranks can correspond to a special sampling method of weighted sampling without replacement also known in statistics as probability proportional to size without replacement (PPSWOR). After a sketch is derived, since the dataset can be large and/or not stored, certain exemplary embodiments might not go back to the original dataset.

At activity 4300, a new dataset item can be received. Each new item can have a weight and distance. A rank can be computed for the item and the all-distances sketch can be updated if the new item has minimum rank among all items in the sketch that are of an equal or smaller distance.

At activity 4400, the bottom-k sketch can be updated and/or maintained responsive to received dataset information. As used herein, the phrase receive means to obtain, take, and/or acquire. The all-distance bottom-k sketch can be automatically maintained based upon new flow records outputted by a statistics collecting module associated with the dataset. As used herein, the phrase statistics collecting module means hardware, firmware, and/or software adapted to perform calculations on parameters of a population. As used herein, the phrase statistics means a numerical fact. Sketches can be updated when new items of the dataset arrive. A new item might be added to the sketch or might not. In addition, because the sketch can be a fixed size, a current item can be taken out if a new item is inserted.

Responsive to received dataset items, certain exemplary embodiments can be adapted to automatically cause the bottom-k sketch to be updated and/or update the bottom-k sketch (e.g., the all-distance bottom-k sketch). Certain exemplary embodiments can, responsive to received dataset items, automatically test the all-distance bottom-k sketch to determine whether the all-distance bottom-k sketch will be updated. Certain exemplary embodiments can, responsive to an automatic determination that a rank value of a received dataset item is less than a rank of a $k^{th}$ smallest current ranked item at a node that has distance that is at most that of the received item, automatically update the all-distance bottom-k sketch. As used herein, the phrase at most means less than or equal to.

At activity 4500, the bottom-k sketch and/or estimators associated with the bottom-k dataset can be stored on a memory device. In certain exemplary embodiments, an estimator of properties of a dataset can be automatically stored. The items in the all-distance bottom-k set can be stored in order of increasing distances from a predetermined location, in order of increasing ranks, or in an arbitrary order. Certain exemplary embodiments can be adapted to, via a processor, automatically store an all-distance bottom-k sketch of a dataset on a machine-readable medium. The processor can be adapted to automatically compute estimators of the all-distance bottom-k sketch from corresponding determined estimators of a k-min sketch of the dataset. The k-min sketch can be derived from the all-distance bottom-k sketch. Certain exemplary embodiments can be adapted to, via a processor, the estimator of properties of the dataset on a machine-readable medium. The processor can be adapted to automatically compute the estimator of properties based upon computed adjusted weights of the all-distance bottom-k sketch of the dataset. The adjusted weights can be computed via a Markov-chain based method. The adjusted weights can be applied to items comprised in the bottom-k sketch. The adjusted weights can be adapted to be used to estimate a size of subpopulations of items. The bottom-k sketch can derived from the all-distance bottom-k sketch.

Figure 5:
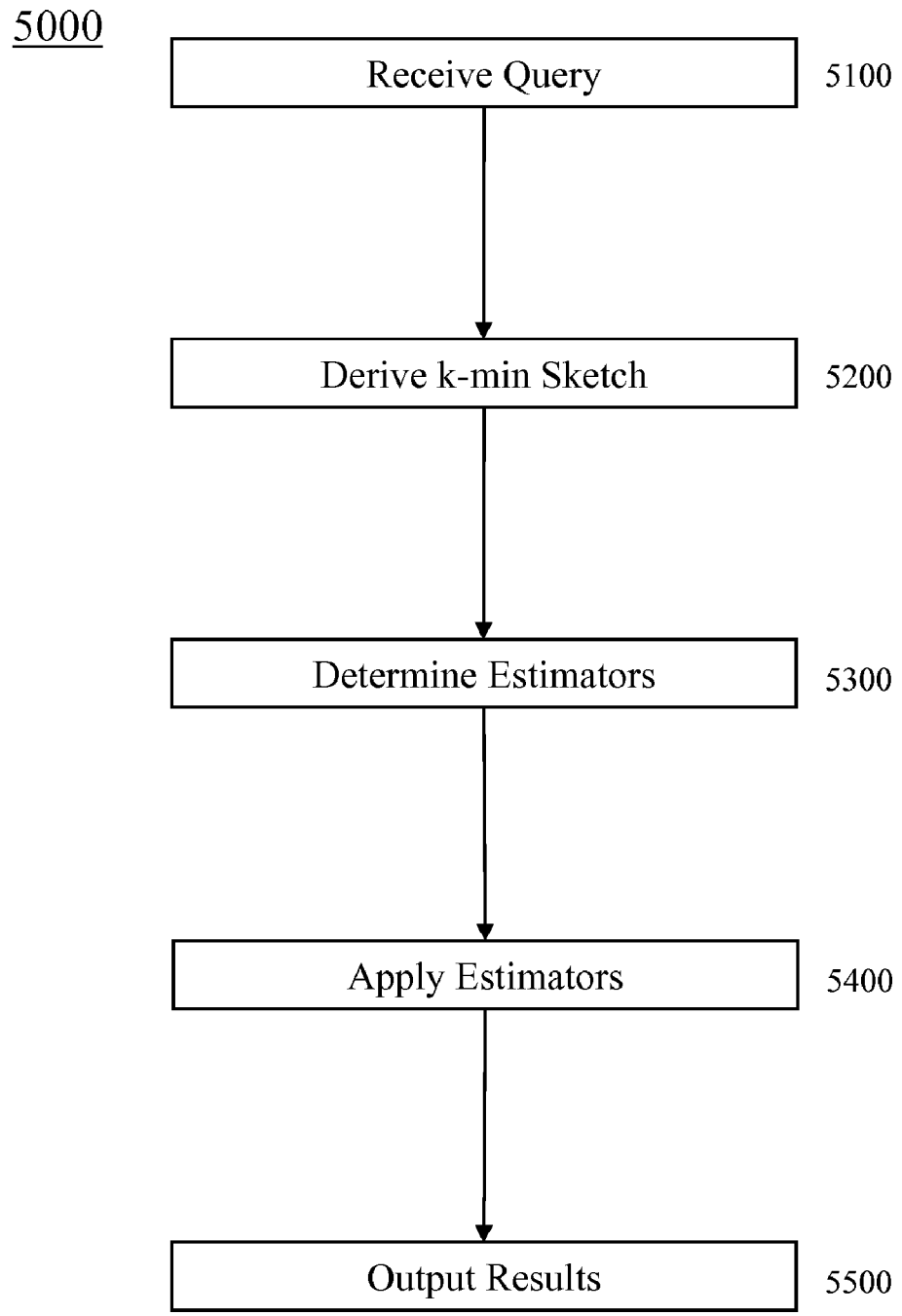
FIG. 5 is a flowchart of an exemplary embodiment of a method 5000.
Figure 6:
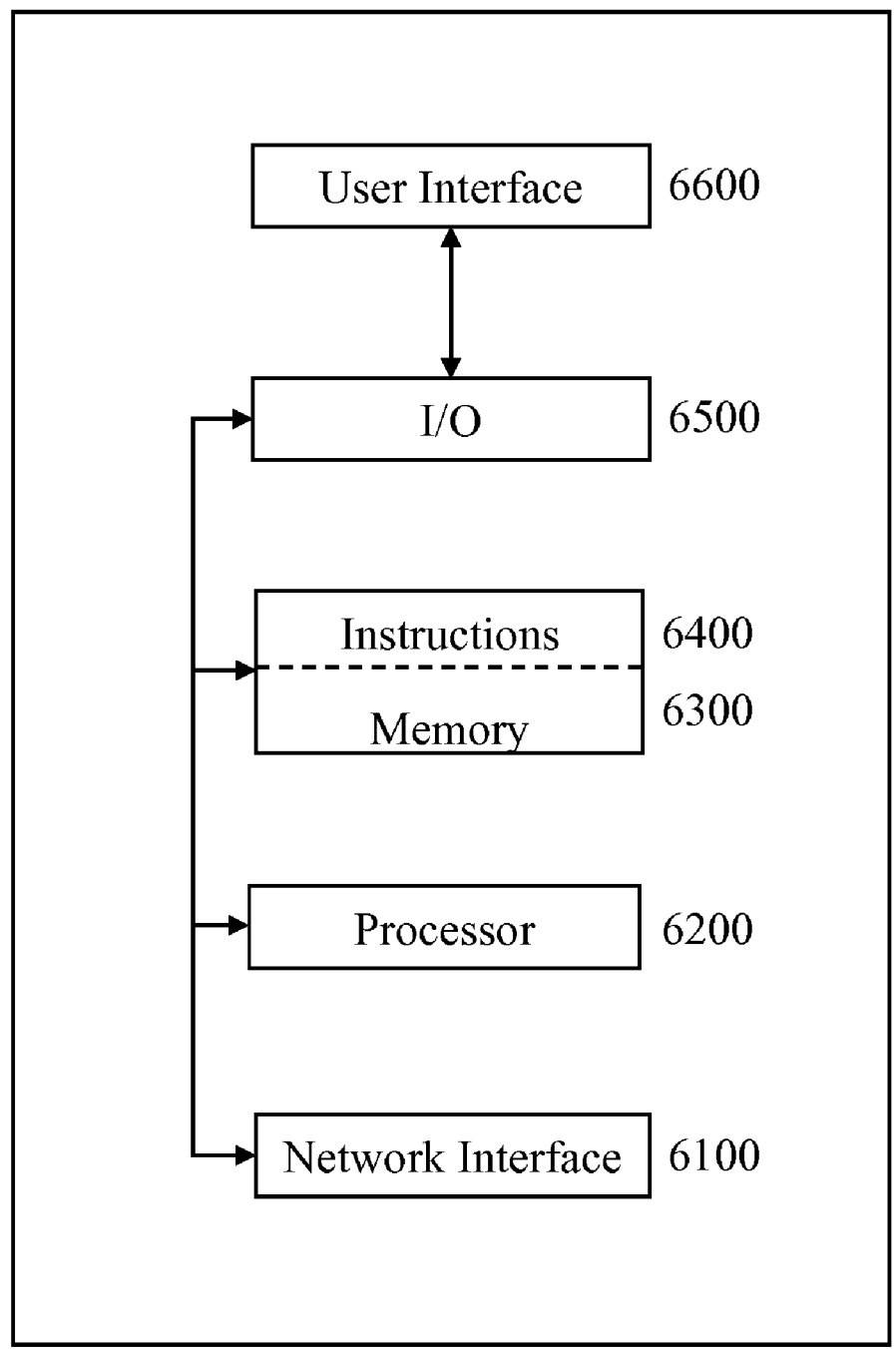
FIG. 6 is a block diagram of an exemplary embodiment of an information device 6000.

FIG. 5 is a flowchart of an exemplary embodiment of a method 5000. As used herein, the phrase method means a process, procedure, and/or collection of related activities for accomplishing something. In certain exemplary embodiments, any activity and/or subset of activities of method 5000 can be performed automatically by an information device. In certain exemplary embodiments, one or more activities of method 5000 can be performed via machine-implementable instructions stored on a machine-readable medium. At activity 4100, a query can be received. For example, the query can be related to a selectivity and/or Jaccard similarity, etc.

At activity 5200, a k-min sketch can be derived from the bottom-k data sketch. As used herein, the phrase k-min sketch means a summary of a set of items with positive weights obtained by, repeating k times, assigning independent random ranks to items where the distribution used for each item depends on the weight of the item and taking the item with minimum rank value. k-mins sketches can represent another form of sampling, which can correspond to weighted sampling with replacement. The k-min sketch might have certain weaker properties, but certain estimators can be obtained with relative ease from the k-min sketch. A bottom-k sketch can encode many corresponding k-mins sketches of the dataset. The same estimators derived via the k-min sketch can be applied to the bottom-k sketch. For example, a k-mins estimator can be used to determine a result responsive to the query. The estimator can be applied to one or more sketches in order to estimate one or more properties of a population associated with the dataset.

At activity 5300, estimators can be determined. The estimators can be manually and/or automatically determined based upon an all-distance bottom-k sketch of the dataset. Once the bottom-k sketch (or all-distances bottom-k sketch, which can compactly encode bottom-k sketches of many neighborhoods) is computed, the bottom-k sketch can be used to estimate properties of the original dataset without actually having the original dataset (other forms of sampling a population can be used to estimate properties of the population). For example, to estimate election results, 1000 people out of the million can be sampled and statistics of the sample can be determined and/or used to estimate the results of the actual population. In certain exemplary embodiments, confidence intervals and/or confidence bounds can be determined.

The estimator can be based upon computed adjusted weights of an all-distance bottom-k sketch of the dataset. As used herein, the phrase based upon means determined in consideration of and/or derived from. The adjusted weights can be unbiased. The estimators of the all-distance bottom-k sketch can be obtained automatically from corresponding determined estimators of the k-min sketch of the dataset. The estimators can have exponentially distributed ranks.

In certain exemplary embodiments, adjusted weights can be automatically computed via a rank conditioning method. As used herein, the phrase rank conditioning method means an algorithm that assigns adjusted weights to items included in a bottom-k sketch of a dataset. The rank conditioning method can be adapted to determine a rank conditioning estimator. The rank conditioning estimator can have zero covariances between different records of the dataset. The adjusted weights are used for estimating the weight of subpopulations of the original dataset. The adjusted weights can be applied to items comprised in a bottom-k sketch. The adjusted weights can be adapted to be used to estimate a size of subpopulations of items. As used herein, the phrase adapted to means suitable, fit, and/or capable of performing a specified function. The bottom-k sketch can be derived from the all-distance bottom-k sketch. The weight of the dataset can be automatically calculated. The automatic estimation of properties of the dataset can be based upon the weight. Certain exemplary can, for an input selection predicate of a subpopulation, calculating an estimate on the selectivity of the sub-population. The selectivity can be one of the estimators. The selectivity can be based upon the computed adjusted weights.

Certain exemplary embodiments can be adapted to automatically compute an adjusted weight via a subset-conditioning method. The estimator of properties of the dataset can be based upon the adjusted weight. The subset-conditioning method can be adapted to compute a subset conditioning estimator. The subset conditioning estimator can have negative covariances between different records of the dataset. Certain exemplary embodiments can be adapted to, via a Markov-chain based method, compute an adjusted weight for items comprised in the all-distance bottom-k sketch. The all-distance bottom-k sketch can have exponentially distributed ranks and/or a known total weight. The estimator of properties of the dataset can be based upon the adjusted weight. A Jaccard similarity of two subsets can be automatically estimated based on an application of estimators to a bottom-k sketch of a union of the two subsets. The estimator of properties of the dataset can be based upon the resemblance.

Certain exemplary embodiments can be adapted to automatically calculate a variance of the dataset. The estimator of properties can be based upon the variance. The estimators can comprise a Horvitz-Thompson estimator. As used herein, the phrase Horvitz-Thompson estimator means an unbiased parameter of a population total of a finite population, applicable in a general case where individuals are sampled with unequal probabilities.

Certain exemplary embodiments can be adapted to, based upon an all-distance bottom-k sketch of a predetermined subset of goods, automatically render an estimated cost to market the predetermined subset of goods to a predetermined subset of consumers. As used herein, the phrase render means to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc. As used herein, the phrase goods means items that are purchased and/or sold. As used herein, the phrase consumer means a potential and/or actual purchaser of goods and/or services. The predetermined subset of goods can be one of a plurality of subsets of a set of goods. The predetermined subset of consumers can be one of a plurality of subsets of a set of consumers. Estimators of the all-distance bottom-k sketch can be obtained automatically from corresponding determined estimators of the k-min sketch of the dataset.

Certain exemplary embodiments can be adapted to, based upon an all-distance bottom-k sketch of a first dataset and an all-distance bottom-k sketch of a second dataset, automatically render an estimate of a size of a planned dataset to be stored on a memory device. As used herein, the phrase plan means to make prior arrangements for. The planned dataset can be a union of the first dataset and the second dataset. Estimators of the all-distance bottom-k sketch can be obtained automatically from corresponding determined estimators of a k-min sketch of the dataset.

Certain exemplary embodiments can be adapted to automatically prompt a network user to modify a network responsive to an automatic estimation of properties of a dataset of flows through the network. As used herein, the phrase responsive means reacting to an influence and/or impetus. As used herein, the phrase prompt means to advise and/or remind. The automatic estimation can be based upon an all-distance bottom-k sketch of the dataset. The properties can comprise automatically calculated confidence intervals of subpopulation-size estimators for the all-distance bottom-k sketch. Each of the confidence intervals can be associated with a corresponding application type flowing through the network. An upper bound and a lower bound of each confidence interval can be based upon an expectation of a sum of independent Poisson trials. As used herein, the phrase independent Poisson trials means a set of discrete tests that have a covariance of approximately zero and are distributed according to a probability distribution defined by the equation $$p(k; \lambda) = \frac{\lambda^k e^{-\lambda}}{k!},$$

where k is a non-negative integer and $\lambda$ is an expected count of occurrences in an interval.

Certain exemplary embodiments can be adapted to, based upon the computed adjusted weights, answering a subpopulation weight query of the dataset. Certain exemplary embodiments can be adapted to automatically determine a total weight of the bottom-k sketch.

Certain exemplary embodiments can automatically estimate properties of flows through a router. The properties can be based upon computed adjusted weights of an all-distance bottom-k sketch of the flows. The adjusted weights can be computed via a Markov-chain based method. The adjusted weights can be applied to items comprised in a bottom-k sketch. The adjusted weights can be adapted to be used to estimate a size of subpopulations of items of the flows. The bottom-k sketch can be derived from the all-distance bottom-k sketch.

In certain exemplary embodiments, a set or subset of activities 5100-5400 can be performed iteratively and/or repeatedly. Certain exemplary embodiments can average N estimates.

At activity 5400, estimators can be applied. In certain exemplary embodiments, estimators determined for the k-min sketch can be applied to a bottom-k sketch and/or an all-distance bottom-k sketch. In certain exemplary embodiments, subpopulation queries can be made. For example, a sample of people, subpopulation can comprise information regarding gender, zipcode, racial and/or background, etc. Certain information can overlap. A predicate can specify a subpopulation. The predicate can be applied to the sample and/or an estimate derived therefrom. Certain exemplary embodiments can provide confidence bounds, which for a given confidence level can provide an upper bound and/or a lower bound of an estimated value. Queries can be processed from the sketch without utilizing the original dataset. Queries can be used for automatic tracking and/or mining of the dataset.

At activity 5500, results obtained responsive to the query can be output. For example, an average of estimators and/or confidence intervals associated with the query can be outputted and/or rendered to a user.

FIG. 5 is a block diagram of an exemplary embodiment of an information device 5000, which in certain operative embodiments can comprise, for example, server 3300 and information device 3100, of FIG. 3. Information device 5000 can comprise any of numerous circuits and/or components, such as for example, one or more network interfaces 5100, one or more processors 5200, one or more memories 5300 containing instructions 5400, one or more input/output (I/O) devices 5500, and/or one or more user interfaces 5600 coupled to I/O device 5500, etc. As used herein, the phrase network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

In certain exemplary embodiments, via one or more user interfaces 5600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein. As used herein, the phrase request means (v.) to express a need and/or desire for; to inquire and/or ask for; (n.) that which communicates an expression of desire and/or that which is asked for. As used herein, the phrase create means to make, form, produce, generate, bring into being, and/or cause to exist.

As used herein, the phrase processor means a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

Certain terms that are used substantively herein are accompanied by definitions. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

As used herein, the phrase information device means any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., Play- Station, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

As used herein, the phrase input/output (I/O) device means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected. As used herein, the phrase port means a data connection in an information device and/or networking device to which a peripheral device or a transmission line from a remote terminal and/or remote system can be attached. As used herein, the phrase system means a collection of mechanisms, devices, machines, articles of manufacture, processes, data, and/or instructions, the collection designed to perform one or more specific functions.

As used herein, the phrase haptic means involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, fraction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the phrase said means when used in a system or device claim, an article indicating a subsequent claim term that has been previously introduced. As used herein, the phrase substantially means to a considerable, large, and/or great, but not necessarily whole and/or entire, extent and/or degree. As used herein, the phrase user means a person, organization, process, device, program, protocol, and/or system that uses a device, system, process, and/or service.

As used herein, the phrase user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method, comprising:
    sampling a first dataset and a second dataset;
    obtaining an all-distance bottom-k sketch of the first dataset and the second dataset;
    deriving a k-min sketch from the all-distance bottom-k sketch by utilizing a processor;
    obtaining estimators of the all-distance bottom-k sketch from corresponding estimators of the k-min sketch, wherein the estimators of the all-distance bottom-k sketch have exponentially distributed ranks;
    computing a rank for a new item received for the first dataset and the second dataset by utilizing the processor, wherein the new item has a distance value;
    updating the all-distance bottom-k sketch if the new item has a minimum rank among all items in the all-distance bottom-k sketch having a distance value smaller than the distance value of the new item;
    storing the new item and all items in the all-distance bottom-k sketch in order of increasing distances in order of increasing ranks; and
    rendering an estimator indicative of a size of a planned dataset to be stored on a memory device, wherein the planned dataset is a union of the first dataset and the second dataset.

2. The method of claim 1, further comprising
    testing the all-distance bottom-k sketch to determine whether the all-distance bottom-k sketch will be updated in response to receiving items for the first and second datasets.

3. The method of claim 1, further comprising
    causing the all-distance bottom-k sketch to be updated in response to receiving items for the first and second datasets.

4. The method of claim 1, further comprising
    updating the all-distance bottom-k sketch in response to receiving items for the first and second datasets; and
    analyzing a number of update operations performed on the all-distance bottom-k sketch.

5. The method of claim 1, further comprising
    updating the all-distance bottom-k sketch in response to a determination that a rank value of an item received for the first and second datasets is less than a rank of a $k^{th}$ smallest current ranked item at a node that has a distance that is at most that of the item received.

6. The method of claim 1, further comprising
    calculating a weight of the first and second datasets, wherein the estimator is based upon the weight.

7. The method of claim 1, further comprising
    calculating an estimator indicative of selectivity of a sub-population for an input selection predicate of the sub-population.

8. The method of claim 1, further comprising
    estimating a Jaccard similarity of two subsets based on an application of estimators to a bottom-k sketch of a union of the two subsets, wherein the estimator of the properties is based upon the Jaccard similarity.

9. The method of claim 1, wherein
    the all-distance bottom-k sketch is maintained based upon new flow records outputted by a statistics collecting module associated with the first and second datasets.

10. The method of claim 1, wherein
    items in the all-distance bottom-k set are stored in order of increasing distances from a predetermined location.

11. A system, comprising:
    a processor configured to:
        sample a first dataset and a second dataset;
        obtain an all-distance bottom-k sketch of the first dataset and the second dataset;
        derive a k-min sketch from the all-distance bottom-k sketch by utilizing a processor;
        obtain estimators of the all-distance bottom-k sketch from corresponding estimators of the k-min sketch, wherein the estimators of the all-distance bottom-k sketch have exponentially distributed ranks;
        compute a rank for a new item received for the first dataset and the second dataset by utilizing the processor, wherein the new item has a distance value;
        update the all-distance bottom-k sketch if the new item has a minimum rank among all items in the all-distance bottom-k sketch having a distance value smaller than the distance value of the new item;
        store the new item and all items in the all-distance bottom-k sketch in order of increasing distances in order of increasing ranks; and
        render an estimator indicative of a size of a planned dataset to be stored on a memory device, wherein the planned dataset is a union of the first dataset and the second dataset.

12. The system of claim 11, wherein the processor is configured to calculate an estimator indicative of selectivity of a sub-population for an input selection predicate of the sub-population.

13. The system of claim 11, wherein the processor is configured to test the all-distance bottom-k sketch to determine whether the all-distance bottom-k sketch is to be updated in response to receiving items for the first and second datasets.

14. The system of claim 11, wherein the processor is configured to store items in the all-distance bottom-k sketch in one of an order of increasing distances from a predetermined location and in an arbitrary order.

15. The system of claim 11, wherein the processor is configured to update the all-distance bottom-k sketch in response to a determination that a rank value of an item received for the first and second datasets is less than a rank of a $k^{th}$ smallest current ranked item.

16. The system of claim 11, wherein the processor is configured to compute a weight and a distance value for each item in the first and second datasets.

17. The system of claim 11, wherein the exponentially distributed ranks correspond to a sampling method using weighted sampling without replacement.

18. A non-transitory computer-readable medium comprising instructions, which, when loaded and executed by an electronic processor, causes the electronic processor to perform activities comprising:
- sampling a first dataset and a second dataset;
- obtaining an all-distance bottom-k sketch of the first dataset and the second dataset;
- deriving a k-min sketch from the all-distance bottom-k sketch by utilizing a processor;
- obtaining estimators of the all-distance bottom-k sketch from corresponding estimators of the k-min sketch, wherein the estimators of the all-distance bottom-k sketch have exponentially distributed ranks;
- computing a rank for a new item received for the first dataset and the second dataset by utilizing the processor, wherein the new item has a distance value;
- updating the all-distance bottom-k sketch if the new item has a minimum rank among all items in the all-distance bottom-k sketch having a distance value smaller than the distance value of the new item;
- storing the new item and all items in the all-distance bottom-k sketch in order of increasing distances in order of increasing ranks; and
- rendering an estimator indicative of a size of a planned dataset to be stored on a memory device, wherein the planned dataset is a union of the first dataset and the second dataset.

19. The computer-readable medium of claim 18, further comprising testing the all-distance bottom-k sketch to determine whether the all-distance bottom-k sketch will be updated in response to receiving items for the first and second datasets.

20. The computer-readable medium of claim 18, further comprising maintaining the all-distance bottom-k sketch based upon new flow records outputted by a statistics collecting module associated with the first and second datasets.

* * * * *